United States Patent
Yasutake et al.

(10) Patent No.: US 7,216,942 B2
(45) Date of Patent: May 15, 2007

(54) VEHICLE MOTION CONTROL DEVICE

(75) Inventors: Toshio Yasutake, Nagoya (JP); Kazuhiro Kato, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 0 days.

(21) Appl. No.: 10/898,236

(22) Filed: Jul. 26, 2004

(65) Prior Publication Data
US 2005/0023895 A1   Feb. 3, 2005

(30) Foreign Application Priority Data
Jul. 30, 2003   (JP) ............... 2003-283062

(51) Int. Cl.
*B60T 8/24*   (2006.01)
*B60T 8/60*   (2006.01)
(52) U.S. Cl. ...................... 303/140; 303/146
(58) Field of Classification Search ............ 303/146, 303/147, 148, 140, 141, 142
See application file for complete search history.

(56) References Cited

U.S. PATENT DOCUMENTS

| | | | | |
|---|---|---|---|---|
| 5,576,959 A | * | 11/1996 | Hrovat et al. | 303/146 |
| 5,634,698 A | * | 6/1997 | Cao et al. | 303/146 |
| 5,722,743 A | * | 3/1998 | Sano | 303/146 |
| 5,816,669 A | * | 10/1998 | Hiwatashi et al. | 303/140 |
| 5,826,951 A | * | 10/1998 | Sano | 303/146 |
| 5,908,225 A | * | 6/1999 | Meier | 303/146 |
| 6,027,183 A | * | 2/2000 | Katayose et al. | 303/146 |
| 6,079,799 A | * | 6/2000 | Sawada et al. | 303/146 |
| 6,234,583 B1 | * | 5/2001 | Eckert | 303/3 |
| 6,322,167 B1 | * | 11/2001 | Pruhs et al. | 303/146 |

FOREIGN PATENT DOCUMENTS

| | | |
|---|---|---|
| DE | 696 10 277 | 5/1996 |
| DE | 196 80 595 | 6/1996 |
| JP | 10016738 | 1/1998 |

OTHER PUBLICATIONS

Office Action dated Feb. 21, 2006 issued by the German Patent Office with English translation.

* cited by examiner

*Primary Examiner*—Robert A. Siconolfi
(74) *Attorney, Agent, or Firm*—Buchanan Ingersoll & Rooney PC

(57) ABSTRACT

This device is applied to a vehicle having a dual circuit brake conduit (so-called X-conduit) comprising a circuit for a front-right wheel and a rear-left wheel and a circuit for a front-left wheel and a rear-right wheel. This device obtains basic control volume Gb based upon a vehicle body speed and a road friction coefficient during an understeer restraining control or oversteer restraining control, and obtains yaw control volume Gd based upon a deviation between a target yaw rate and actual yaw rate. Then, it exerts braking force according to the basic control volume Gb respectively on two wheels of one circuit to which front wheel at the outer side of the turning direction and the rear wheel at the inner side of the turning direction belong, to thereby decelerate the vehicle, and further exerts braking force according to the yaw control volume Gd on either one wheel of the same circuit, thereby producing a yawing moment for making the turning state close to the target state.

20 Claims, 11 Drawing Sheets

➡ : Direction of braking force
→ : Direction of vehicle turning direction

VEHICLE MOTION CONTROL DEVICE

BACKGROUND OF THE INVENTION

1. Field of the Invention

The present invention relates to a vehicle motion control device that causes a yawing moment on a vehicle for bringing the turning state of the vehicle into a target state by exerting braking force by brake fluid pressure on a predetermined wheel.

2. Description of the Prior Arts

There has conventionally been a demand for controlling a vehicle motion such that the turning state of the vehicle is brought into a target state (for example, into a neutral state), when the turning state of the vehicle is in an understeer state or oversteer state during the turning of the vehicle. The understeer state can be eliminated by exerting braking force by brake fluid pressure on a predetermined wheel for causing a yawing moment on the vehicle in the direction same as the turning direction of the vehicle. On the other hand, the oversteer state can be eliminated by exerting braking force by brake fluid pressure on a predetermined wheel for causing a yawing moment on the vehicle in the direction opposite to the turning direction of the vehicle.

On the other hand, a brake conduit for supplying brake fluid pressure to a wheel cylinder of each wheel in a four-wheel vehicle is generally composed of a dual circuit (a so-called X-conduit) comprising a circuit for supplying brake fluid pressure to each wheel cylinder of a front-right wheel and a rear-left wheel and a circuit for supplying brake fluid pressure to each wheel cylinder of a front-left wheel and a rear-right wheel, each of which is independent of each other.

In order to bring the turning state of the vehicle, provided with the brake conduit as described above, into the target state, a vehicle motion control device, for example, disclosed in the patent document 1 exerts braking force by brake fluid pressure on only the rear wheel at the inner side of the turning direction to thereby cause a yawing moment in the direction same as the turning direction, when the turning state of the vehicle is in the understeer state. On the other hand, this device exerts braking force by brake fluid pressure on only the front wheel at the outer side of the turning direction to thereby cause a yawing moment in the direction opposite to the turning direction, when the turning state of the vehicle is in the oversteer state. Specifically, this device exerts braking force by brake fluid pressure on only one wheel in one circuit of the above-mentioned dual circuit to which the front wheel at the outer side of the turning direction and the rear wheel at the inner side of the turning direction belong.

[Patent Document 1]

Japanese Unexamined Patent Application No. HEI10-16738

It has widely been known that the maximum road friction force (accordingly, the maximum braking force) that can be generated on a tire in the advancing direction of the tire decreases as the road friction force (i.e., cornering force) generated on the tire in the direction perpendicular to the advancing direction of the tire increases. Further, upon the turning of the vehicle, the cornering force generated on the tire in the direction perpendicular to the advancing direction of the tire generally increases with the increase in the centrifugal force exerted on the vehicle as the vehicle body speed increases. Accordingly, the maximum braking force that can be generated on the tire in the advancing direction of the tire upon the turning of the vehicle decreases as the vehicle body speed increases.

From the above, in case where the vehicle turns at a relatively high speed and its turning state becomes a relatively excessive understeer state or a relatively excessive oversteer state, for example, there may be the case where the magnitude of the braking force by the brake fluid pressure that should be exerted on one wheel of one circuit exceeds the maximum braking force that can be generated on the tire of the wheel in the disclosed device. In this case, the braking force by the brake fluid pressure exerted on the aforesaid one wheel is limited to the maximum braking force. As a result, a yawing moment having the expected magnitude is not caused on the vehicle, thereby entailing a problem that the understeer state or the oversteer state cannot surely be eliminated.

On the other hand, if the vehicle can effectively be decelerated (i.e., if the centrifugal force exerted on the vehicle can be reduced) in this case, the maximum braking force increases to thereby cause more greater yawing moment on the vehicle, so that the aforesaid problem can be solved.

SUMMARY OF THE INVENTION

The present invention aims to provide a vehicle motion control device that can produce a yawing moment for bringing the turning state of the vehicle into a target state while effectively decelerating the vehicle.

A feature of the present invention is that a vehicle motion control device applied to a vehicle provided with a brake conduit composed of a dual circuit comprising a circuit for supplying brake fluid pressure to each wheel cylinder of a front-right wheel and a rear-left wheel and a circuit for supplying brake fluid pressure to each wheel cylinder of a front-left wheel and a rear-right wheel, each of which is independent of each other, has turning state obtaining means that obtains a turning state of the vehicle and turning state control means that produces a predetermined yawing moment on the vehicle for bringing the turning state of the vehicle into a target state by respectively exerting braking force by brake fluid pressure on (only) two wheels belonging to one of the above-mentioned dual circuit.

Specifically, the turning state control means is preferably configured to exert braking force on two wheels of the front wheel at the outer side of the turning direction and the rear wheel at the inner side of the turning direction as follows. Specifically, when the turning state of the vehicle is in the understeer state, it exerts braking force by brake fluid pressure such that the braking force exerted on the rear wheel at the inner side of the turning direction becomes greater than the braking force exerted on the front wheel at the outer side of the turning direction. On the other hand, when the turning state of the vehicle is in the oversteer state, it exerts braking force by brake fluid pressure such that the braking force exerted on the front wheel at the outer side of the turning direction becomes greater than the braking force exerted on the rear wheel at the inner side of the turning direction.

This allows to exert braking force by brake fluid pressure on two wheels of one circuit, of the above-mentioned dual circuit, to which the front wheel at the outer side of the turning direction and the rear wheel at the inner side of the turning direction belong, in order to produce the yawing moment on the vehicle for bringing the turning state (understeer state or oversteer state) of the vehicle into the target state (e.g., neutral steer state). Accordingly, the total sum of the braking forces exerted on wheels can be great compared to the conventional device. As a result, the (whole) braking force exerted on these two wheels can effectively function as decelerating force for decelerating the vehicle, whereby the vehicle is effectively decelerated. Therefore, the expected yawing moment can more suitably be produced on the vehicle, thereby being capable of more surely bringing the turning state of the vehicle into the target state.

In this case, the turning state control means preferably has basic control volume calculating means that calculates basic control volume for decelerating the vehicle based upon the running state of the vehicle and yaw control volume calculating means that calculates yaw control volume for producing the predetermined yawing moment on the vehicle based upon the turning state of the vehicle, wherein, when the turning state of the vehicle is in the understeer state, it is preferably configured to exert the braking force by the brake fluid pressure according to the basic control volume on the front wheel at the outer side of the turning direction and exert the braking force, that is obtained by adding the braking force by the brake fluid pressure according to the yaw control volume to the braking force by the brake fluid pressure according to the basic control volume, on the rear wheel at the inner side of the turning direction, while, when the turning state of the vehicle is in the oversteer state, it is preferably configured to exert the braking force by the brake fluid pressure according to the basic control volume on the rear wheel at the inner side of the turning direction and exert the braking force, that is obtained by adding the braking force by the brake fluid pressure according to the yaw control volume to the braking force by the brake fluid pressure according to the basic control volume, on the front wheel at the outer side of the turning direction.

Here, the yaw control volume calculating means preferably calculates the yaw control volume based upon a deviation between a target yaw rate related amount set based upon at least a vehicle body speed and a steering operation amount and an actual yaw rate related amount exerted on the vehicle. The "yaw rate related amount" means here an amount showing a degree of the turning of the vehicle. Examples of this include a yaw rate itself of the vehicle or an acceleration exerted on the vehicle in the side-to-side direction of the vehicle body (i.e., lateral acceleration).

According to this, the braking force by the brake fluid pressure that should be exerted on both wheels in the above-mentioned one circuit for decelerating the vehicle is set based upon the calculated basic control volume, while the braking force by the brake fluid pressure that should be exerted on either one of the two wheels for producing the predetermined yawing moment on the vehicle is set based upon the calculated yaw control volume. Specifically, two braking forces, each of which is exerted for a different object, are independently set. Accordingly, the braking force by the brake fluid pressure that should be exerted on each of two wheels can more accurately be set.

Further, the basic control volume calculating means is preferably configured to calculate the basic control volume based upon at least one of the vehicle body speed and a road friction coefficient.

The centrifugal force exerted on the vehicle is proportional to the square of the vehicle body speed. Specifically, as the vehicle body speed increases, the increasing amount of the centrifugal force exerted on the vehicle to the increase in the vehicle body speed increases. Accordingly, as the vehicle body speed increases, a degree of a demand for reducing the vehicle body speed increases. Further, as the road friction coefficient increases, the maximum braking force that can be produced on a tire increases, thereby being capable of more effectively decelerating the vehicle.

From the above, the configuration in which the basic control volume calculated for decelerating the vehicle is calculated based upon at least one of the vehicle body speed and the road friction coefficient can increase the basic control volume according to the increase in the vehicle body speed and the road friction coefficient, resulting in being capable of more suitably decelerating the vehicle.

Moreover, the basic control volume calculating means is preferably configured to calculate the basic control volume such that the changing speed of the basic control volume is limited according to the running state of the vehicle. There is a tendency that a degree of a pitching generated on the vehicle body increases according to the increasing speed of the decelerating force exerted on the vehicle. This pitching is one of factors that make the vehicle motion unstable. Therefore, it is required that the occurrence of excessive pitching is prevented.

On the other hand, as the vehicle body speed increases, a degree of a demand for preventing the excessive pitching generally increases. Moreover, as the road friction coefficient increases, the maximum changing speed of the braking force that can be produced on a tire increases, so that the excessive pitching is liable to be produced. Therefore, the configuration in which the changing speed of the basic control volume is limited according to the running state of the vehicle (for example, vehicle body speed, road friction coefficient or the like) as described above can lower the upper limit value (limit value) of the changing speed of the basic control volume according to, for example, the increase in the vehicle body speed and the increase in the road friction coefficient. As a result, the occurrence of the excessive pitching can suitably be prevented while satisfactorily ensuring the decelerating force exerted on the vehicle body.

Moreover, the basic control volume calculating means is preferably configured to calculate the basic control volume such that the basic control volume is limited according to the yaw control volume calculated by the yaw control volume calculating means.

As previously explained, the road friction force (accordingly, the braking force) produced on a tire in the advancing direction of the tire is limited to some value (upper limit value) according to the road friction coefficient. Therefore, when braking force exceeding the upper limit value is exerted on the tire, the tire is tend to be locked, with the result that the vehicle is liable to be unstable. Accordingly, the total sum of the braking force by the brake fluid pressure generated on the two wheels by the turning state control means and the sum of the braking force according to the basic control volume and the braking force according to the yaw control volume generated on one of the two wheels by the turning state control means should be limited to some value.

In this case, priority should be given to the generation of the predetermined yawing moment on the vehicle for bringing the turning state of the vehicle into the target state, and, of the braking force according to the basic control volume and the braking force according to the yaw control volume, the former should be limited. Therefore, the configuration in which the basic control volume is limited according to the yaw control volume as described above can bring the turning state of the vehicle into the target state while ensuring the stability of the vehicle. When the calculated yaw control volume itself is a great value exceeding the some value in this case, the yaw control volume is limited to the some value and the basic control volume is set to "0".

In case where either one of the vehicle motion control devices is configured to calculate the braking force by the brake fluid pressure exerted on the two wheels based upon the basic control volume and the yaw control volume, the turning state control means is preferably configured to lower the output of the driving source of the vehicle according to the driving state of the vehicle and exert, on the two wheels, braking force by brake fluid pressure that is smaller than the braking force by the brake fluid pressure according to the basic control volume by the braking force corresponding to the decrease in the output of the driving source, instead of exerting the braking force by the brake fluid pressure according to the basic control volume on the two wheels.

When the output of the driving source (engine) of the vehicle is lowered, the braking force corresponding to the reduction in the output of the driving source is substantially acted on the driving wheel of the vehicle. Further, it is not preferable to decelerate the vehicle by the braking force by the brake fluid pressure while maintaining the output of the driving source of the vehicle in case where, or the like, the vehicle is accelerated by the output, since it entails an increase in consumed energy.

Therefore, in case where the output of the driving source can be lowered depending on the driving state of the vehicle (for example, throttle valve opening, revolution speed of the engine or the like), the above-mentioned configuration can surely decelerate the vehicle and restrain the increase in consumed energy.

In order to make the consumed energy at a minimum, it is preferable that the output reducing amount that should be adjusted (adjusted output reducing amount) of the driving source can be a maximum amount adjustable at this time (adjustable maximum output reducing amount). Therefore, when the control volume relating to the brake fluid pressure corresponding to the adjustable maximum output reducing amount exceeds the basic control volume in this case, the adjusted output reducing amount becomes a value corresponding to the basic control volume and the value of "braking force by brake fluid pressure that is smaller than the braking force by the brake fluid pressure according to the basic control volume by the braking force corresponding to the decrease in the output of the driving source" becomes "0". As a result, the braking force by the brake fluid pressure is exerted on only a wheel (single wheel) on which the braking force according to the yaw control volume is generated.

BRIEF DESCRIPTION OF THE DRAWINGS

FIG. 8 is a flowchart showing a routine executed by a CPU shown in FIG. 1 for calculating a wheel speed or the like;

DESCRIPTION OF THE PREFERRED EMBODIMENT

Figure 1:
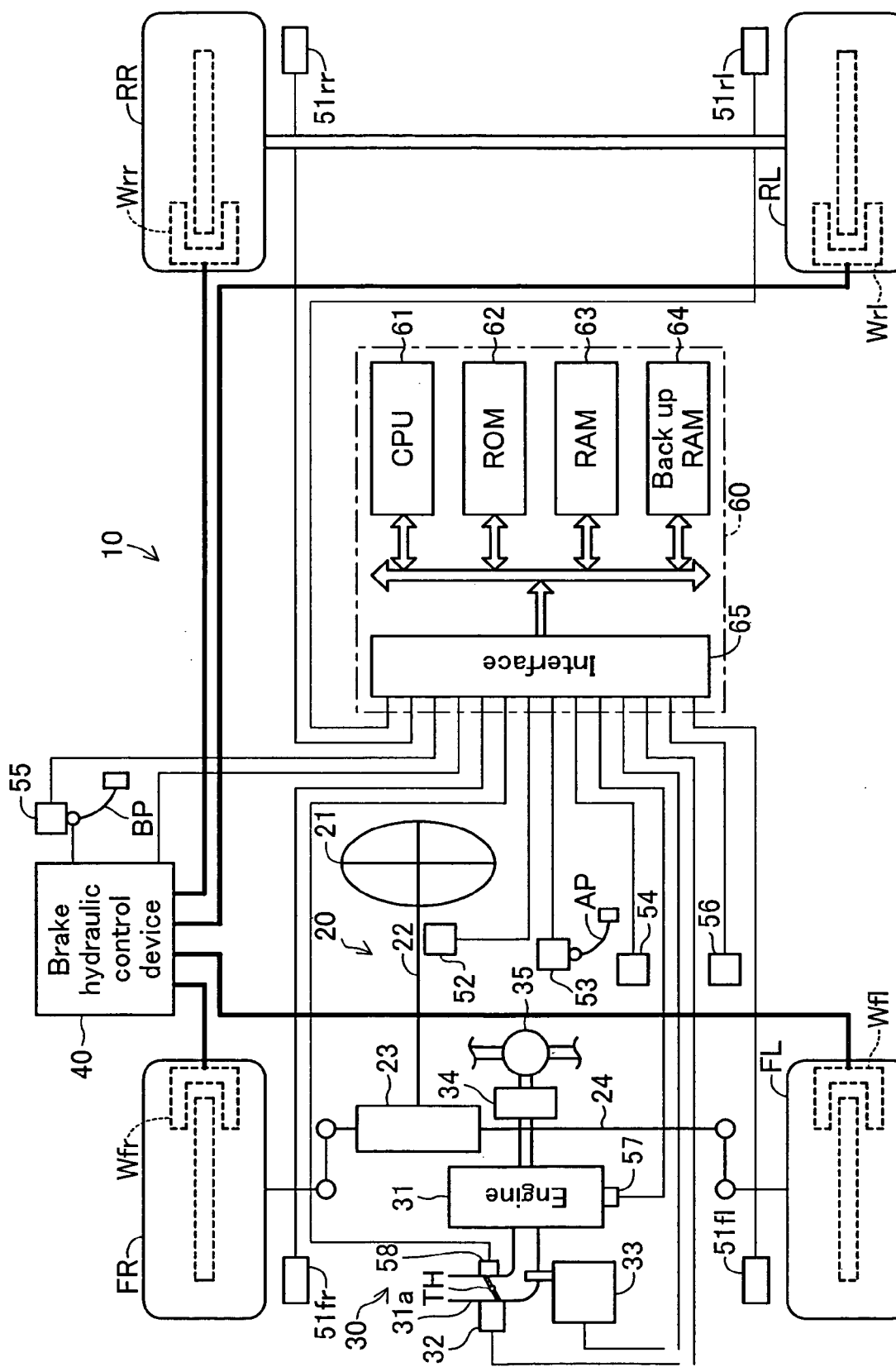
FIG. 1 is a schematic constructional view of a vehicle having mounted thereto a vehicle motion control device according to an embodiment of the present invention.

A preferred embodiment of a vehicle control device according to the present invention will be explained hereinbelow with reference to drawings. FIG. 1 shows a schematic construction of a vehicle provided with a vehicle control device 10 according to the present invention. This vehicle is a four-wheel drive vehicle using a front-wheel drive system and having two front wheels (front-left wheel FL and front-right wheel FR) that are steering wheels as well as driving wheels and two rear wheels (rear-left wheel RL and rear-right wheel RR) that are non-driving wheels.

The vehicle control device 10 is configured to include a front-wheel steering mechanism 20 for steering the steering wheels FL and FR, a driving force transmission section 30 that produces driving force and respectively transmits this driving force to each driving wheel RL and RR, a brake hydraulic control device 40 for producing braking force by a brake fluid pressure on each wheel, a sensor section 50 composed of various sensors and an electrical control apparatus 60.

The front-wheel steering mechanism 20 is composed of a steering 21, column 22 integrally pivotable with the steering 21, steering actuator 23 linked to the column 22 and a link mechanism 24 including a tie rod that is moved in the side-to-side direction of the vehicle body by the steering actuator 23 and a link that can steer the steering wheels FL and FR by the movement of the tie rod. By this configuration, rotating the steering 21 from its center position (reference position) changes the steering angles of the steering wheels FL and FR from the reference angle at which the vehicle runs straight.

The steering actuator 23 is composed to include a known so-called hydraulic power steering device that generates assisting force for moving the tie rod according to the rotational torque of the column 22, thereby shifting the tie rod from the neutral position to the side-to-side direction of the vehicle by the assisting force in proportion to the steering angle $\theta s$ from the neutral position of the steering 21. The configuration and operation of the steering actuator 23 are well known, so that the detailed explanation thereof is omitted here.

The driving force transmission section 30 is configured to include an engine 31 that produces driving force, a throttle valve actuator 32 arranged in an inlet pipe 31a of the engine 31 and having a DC motor for controlling an opening TA of a throttle valve TH that can modulate the cross-sectional area of the inlet path, a fuel injection device 33 including an injector that injects fuel to the vicinity of an inlet port not shown of the engine 31, a transmission 34 connected to the output shaft of the engine 31 and a differential gear 35 that suitably distributes and transmits the driving force transmitted from the transmission 34 to front wheels FR and FL.

Figure 2:
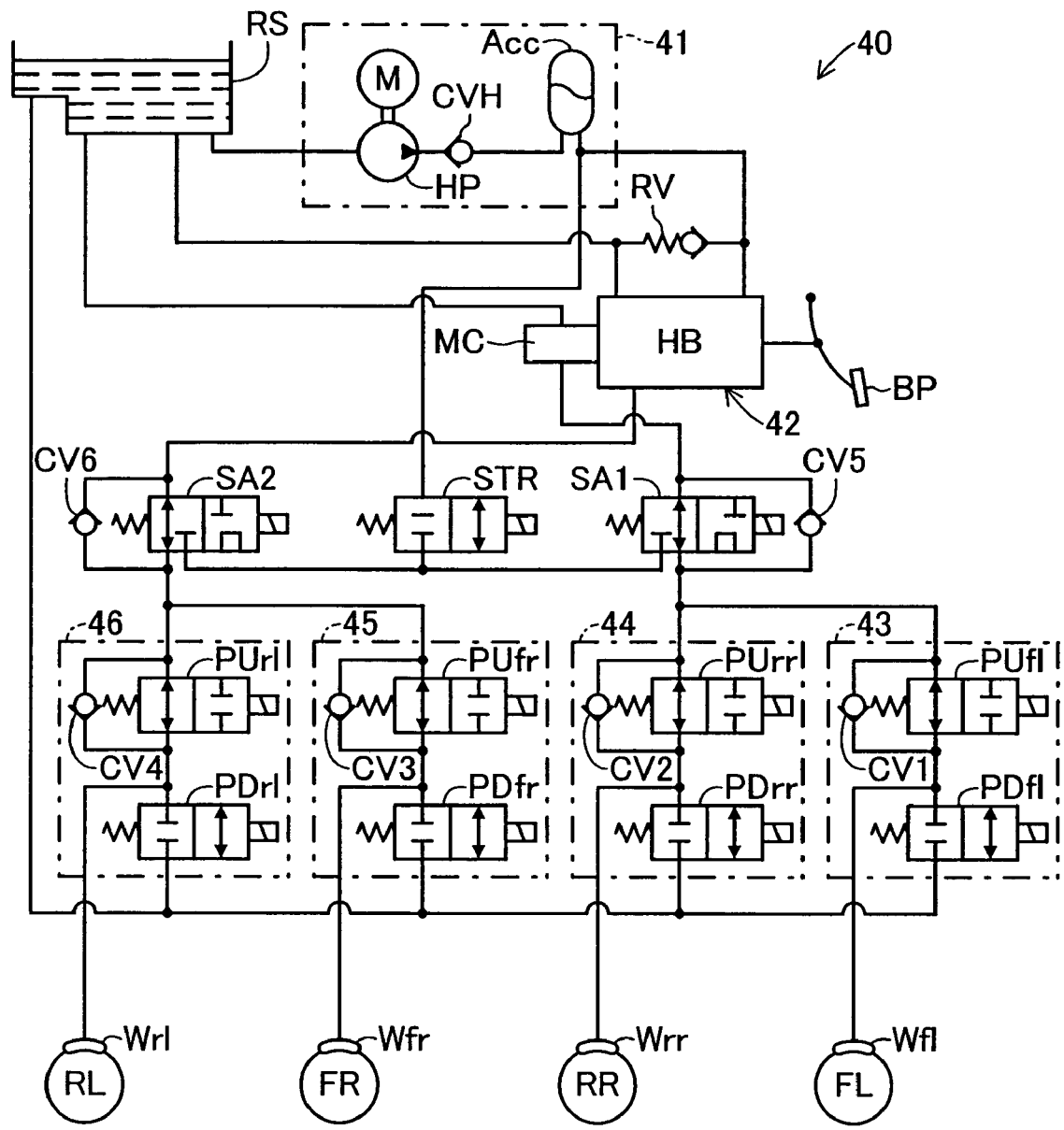
FIG. 2 is a schematic constructional view of a brake hydraulic control device shown in FIG. 1.

The brake hydraulic control device 40 whose construction is schematically shown in FIG. 2 is configured to include a high-pressure generating section 41, a brake fluid pressure generating section 42 that generates brake fluid pressure according to operating force on a brake pedal BP, and an FL brake fluid pressure adjusting section 43, an RR brake fluid pressure adjusting section 44, an FR brake fluid pressure adjusting section 45 and an RL brake fluid pressure adjusting section 46 that are capable of adjusting brake fluid pressure supplied respectively to wheel cylinders Wfl, Wrr, Wfr and Wrl each arranged at each wheel FL, RR, FR and RL.

The high-pressure generating section 41 is configured to include an electric motor M, a hydraulic pump HP driven by the electric motor M and pressurizing brake fluid in a reservoir RS and an accumulator Acc that is connected to the discharge side of the hydraulic pump HP via a check valve CVH and stores brake fluid pressurized by the hydraulic pump HP.

The electric motor M is driven when the fluid pressure in the accumulator Acc is less than a predetermined lower limit value, while it is halted when the fluid pressure in the accumulator Acc exceeds a predetermined upper limit value. By this, the fluid pressure in the accumulator Acc is always kept high within a predetermined range.

A relief valve RV is arranged between the accumulator Acc and the reservoir RS. When the fluid pressure in the accumulator Acc becomes extraordinarily higher than the above-mentioned high pressure, the brake fluid in the accumulator Acc is returned to the reservoir RS. This operation protects a hydraulic circuit in the high-pressure generating section 41.

The brake hydraulic generating section 42 is composed of a hydraulic booster HB that is driven according to the operation of the brake pedal BP and a master cylinder MC connected to the hydraulic booster HB. The hydraulic booster HB assists the operating force on the brake pedal BP at a predetermined ratio by utilizing the above-mentioned high pressure supplied from the high-pressure generating section 41 and transmits the assisted operating force to the master cylinder MC.

The master cylinder MC generates master cylinder fluid pressure according to the assisted operating force. Further, the hydraulic booster HB, by inputting this master cylinder fluid pressure, generates regulator fluid pressure that is approximately equal to the master cylinder fluid pressure according to the assisted operating force. The constructions and operations of the master cylinder MC and hydraulic booster HB are well known, so that their detailed explanations are omitted here. As described above, the master cylinder MC and hydraulic booster HB respectively generate master cylinder fluid pressure and regulator fluid pressure according to the operating force on the brake pedal BP.

A control valve SA1 that is a three-port two-position switching type solenoid-operated valve is arranged between the master cylinder MC and each of the upstream side of the FL brake fluid pressure adjusting section 43 and the upstream side of the RR brake fluid pressure adjusting section 44. Similarly, a control valve SA2 that is a three-port two-position switching type solenoid-operated valve is arranged between the hydraulic booster HB and each of the upstream side of the FR brake fluid pressure adjusting section 45 and the upstream side of the RL brake fluid pressure adjusting section 46. Further, a change-over valve STR that is a two-port two-position switching type, normally closed, solenoid-operated on-off valve is arranged between the high-pressure generating section 41 and each of the control valve SA1 and the control valve SA2.

When the control valve SA1 is in the first position in FIG. 2 (in the non-actuated position), it functions to establish communication between the master cylinder MC and each of the upstream section of the FL brake fluid pressure adjusting section 43 and the upstream section of the RR brake fluid pressure adjusting section 44. When in the second position (in the actuated position), it functions to cut off the communication between the master cylinder MC and each of the upstream section of the FL brake fluid pressure adjusting section 43 and the upstream section of the RR brake fluid pressure adjusting section 44, but to establish the communication between the change-over valve STR and each of the upstream section of the FL brake fluid pressure adjusting section 43 and the upstream section of the RR brake fluid pressure adjusting section 44.

When the control valve SA2 is in the first position in FIG. 2 (in the non-actuated position), it functions to establish communication between the hydraulic booster HB and each of the upstream section of the FR brake fluid pressure adjusting section 45 and the upstream section of the RL brake fluid pressure adjusting section 46. When in the second position (in the actuated position), it functions to cut off the communication between the hydraulic booster HB and each of the upstream section of the FR brake fluid pressure adjusting section 45 and the upstream section of the RL brake fluid pressure adjusting section 46, but to establish the communication between the change-over valve STR and each of the upstream section of the FR brake fluid pressure adjusting section 45 and the upstream section of the RL brake fluid pressure adjusting section 46.

By this operation, master cylinder fluid pressure is supplied to each of the upstream section of the FL brake fluid pressure adjusting section 43 and the upstream section of the RR brake fluid pressure adjusting section 44 when the control valve SA1 is placed at the first position, while high pressure generated from the high-pressure generating section 41 is supplied thereto when the control valve SA1 is placed at the second position and the change-over valve STR is placed at the second position (at the actuated position).

Similarly, regulator fluid pressure is supplied to each of the upstream section of the FR brake fluid pressure adjusting section 45 and the upstream section of the RL brake fluid pressure adjusting section 46 when the control valve SA2 is placed at the first position, while high pressure generated from the high-pressure generating section 41 is supplied thereto when the control valve SA2 is placed at the second position and the change-over valve STR is placed at the second position.

Specifically, the brake conduit in this embodiment is composed of a dual circuit having a circuit for supplying brake fluid pressure to each wheel cylinder of the wheels FL and RR and a circuit for supplying brake fluid pressure to each wheel cylinder of the wheels FR and RL, each of which is independent of each other.

The FL brake fluid pressure adjusting section 43 is composed of a pressure increasing valve PUfl that is a two-port two-position switching type, normally opened, solenoid-operated on-off valve and a pressure reducing valve PDfl that is a two-port two-position switching type, normally closed, solenoid-operated on-off valve. The pressure increasing valve PUfl, when placed at the first position in FIG. 2 (at the non-actuated position), establishes a communication between the upstream section of the FL brake fluid pressure adjusting section 43 and the wheel cylinder Wfl, while it cuts off the communication between the upstream section of the FL brake fluid pressure adjusting section 43 and the wheel cylinder Wfl when placed at the second position (at the actuated position). The pressure reducing valve PDfl cuts off the communication between the wheel cylinder Wfl and the reservoir RS when it is placed at the first position in FIG. 2 (at the non-actuated position), while it establishes the communication between the wheel cylinder Wfl and the reservoir RS when placed at the second position (at the actuated position).

By this operation, the brake fluid pressure in the wheel cylinder Wfl is increased when the pressure increasing valve PUfl and the pressure reducing valve PDfl are placed at the first position since the fluid pressure at the upstream section of the FL brake fluid pressure adjusting section 43 is supplied into the wheel cylinder Wfl. When the pressure increasing valve PUfl is placed at the second position and the pressure reducing valve PDfl is placed at the first position, the brake fluid pressure in the wheel cylinder Wfl is kept to be the fluid pressure at the time in the wheel cylinder Wfl regardless of the fluid pressure at the upstream section of the FL brake fluid pressure adjusting section 43. When the pressure increasing valve PUfl and the pressure reducing valve PDfl are placed at the second position, the brake fluid in the wheel cylinder Wfl is returned to the reservoir RS to thereby reduce the fluid pressure.

A check valve CV1 is arranged in parallel to the pressure increasing valve PUfl for allowing only one-way flow of the brake fluid from the wheel cylinder Wfl side to the upstream section of the FL brake fluid pressure adjusting section 43. This arrangement brings a rapid reduction of the brake fluid pressure in the wheel cylinder Wfl when the released brake pedal BP is opened with the control valve SA1 placed at the first position.

Similarly, the RR brake fluid pressure adjusting section 44, FR brake fluid pressure adjusting section 45 and RL brake fluid pressure adjusting section 46 are respectively composed of a pressure increasing valve PUrr and pressure reducing valve PDrr, a pressure increasing valve PUfr and pressure reducing valve PDfr and a pressure increasing valve PUrl and pressure reducing valve PDrl. The position of each pressure increasing valve and pressure reducing valve is controlled, whereby the brake fluid pressure in the wheel cylinder Wrr, wheel cylinder Wfr and wheel cylinder Wrl can be increased, kept and reduced. Further, check valves CV2, CV3 and CV4 that can attain the function same as that of the check valve CV1 are respectively arranged in parallel to the pressure increasing valves PUrr, PUfr and PUrl.

A check valve CV5 is arranged in parallel to the control valve SA1 for allowing only one-way flow of the brake fluid from the upstream side to the downstream side. When the control valve SA1 is placed at the second position and the communication between the master cylinder MC and each of the FL brake fluid pressure adjusting section 43 and the RR brake fluid pressure adjusting section 44 is cut off, the brake fluid pressure in the wheel cylinders Wfl and Wrr can be increased by operating the brake pedal BP. Further, arranged in parallel to the control valve SA2 is a check valve CV6 that can attain the function same as that of the check valve CV5.

By the construction described above, the brake hydraulic control device 40 can supply brake fluid pressure according to the operating force on the brake pedal BP to each wheel cylinder when all the solenoid-operated valves are in the first position. Further, under this state, it can reduce, for example, only the brake fluid pressure in the wheel cylinder Wrr by a predetermined amount by controlling the pressure increasing valve PUrr and pressure reducing valve PDrr.

By changing the control valve SA1, change-over valve STR and pressure increasing valve PUfl to the second position and controlling the pressure increasing valve PUrr and pressure reducing valve PDrr respectively, the brake hydraulic control device 40 can increase only the brake fluid pressure in the wheel cylinder Wrr by a predetermined value by utilizing the high pressure generated from the high-pressure generating section 41 while the brake fluid pressure in the wheel cylinder Wfl is maintained under a state where the brake pedal BP is not operated (is released). As described above, the brake hydraulic control device 40 independently controls the brake fluid pressure in the wheel cylinder of each wheel regardless of the operation on the brake pedal BP, thereby being capable of exerting predetermined braking force on every independent wheel.

Referring again to FIG. 1, the sensor section 50 is composed of wheel speed sensors 51fl, 51fr, 51rl and 51rr each constructed by a rotary encoder that outputs a signal having a pulse every time each wheel FL, FR, RL and RR rotates at a predetermined angle, a steering angle sensor 52, serving as steering operation amount obtaining means, for detecting the angle of rotation from the neutral position of the steering 21 to output a signal showing a steering angle θs, an accelerator opening sensor 53 that detects an operation amount of an accelerator pedal AP operated by a driver and outputs a signal showing the operation amount Accp of the accelerator pedal AP, a lateral acceleration sensor 54 that detects a lateral acceleration which is a value of a component exerted on the vehicle in the side-to-side direction of a vehicle body and outputs a signal showing the lateral acceleration Gy (m/s$^2$), a brake switch 55 that detects whether the brake pedal BP is operated or not by the driver for outputting a signal showing that the braking operation is performed or not, a yaw rate sensor 56 that detects an actual yaw rate exerted on the vehicle and outputs a signal showing the yaw rate Yr (deg/sec), a revolution speed sensor 57 that detects a revolution speed of the engine 31 and outputs a signal showing the engine revolution speed NE and a throttle valve opening sensor 58 that detects an opening of the throttle valve TH and outputs a signal showing a throttle valve opening TA.

The steering angle θs is set to be "0" when the steering 21 is positioned at the neutral position, set to a positive value when the steering 21 is rotated in the counterclockwise direction (seen by a driver) from the neutral position, and set to a negative value when the steering 21 is rotated in the clockwise direction from the neutral position. Further, the lateral acceleration Gy and the yaw rate Yr are set so as to take a positive value when the vehicle turns in the leftward direction and to take a negative value when the vehicle turns in the rightward direction.

The electrical control apparatus 60 is a microcomputer including a CPU 61, a ROM 62 that stores in advance a routine (program) executed by the CPU 61, table (look-up table, map), constant or the like, a RAM 63 to which the CPU 61 temporarily stores data as needed, a back-up RAM 64 that stores data with a power supply turned on and holds the stored data even during a period when the power supply is turned off and an interface 65 including an AD converter, those of which are connected to one another with a bus. The interface 65 is connected to the sensors 51 to 58, thereby supplying to the CPU 61 signals from the sensors 51 to 58 and transmitting a driving signal to each solenoid-operated valve and motor M of the brake hydraulic control device 40, the throttle valve actuator 32 and the fuel injection device 33 according to the instruction from the CPU 61.

By this operation, the throttle valve actuator 32 drives the throttle valve TH such that the opening TA thereof becomes, in principle, an opening that is set according to the operation amount Accp of the accelerator pedal AP, and the fuel injection device 33 injects fuel in a required amount so as to obtain a predetermined target air-fuel ratio (theoretical air-fuel ratio) concerning intake air mass according to the opening TA of the throttle valve TH.

[Outline of Vehicle Motion Control]

The vehicle motion control device 10 (simply referred sometimes to as "this device" hereinbelow) according to the invention having the above-mentioned configuration calculates a target yaw rate Yrt (deg/sec) based upon a following formula (1) that is a theoretical formula as a predetermined rule directed from a vehicle motion model. The target yaw rate Yrt is set to the positive value when the vehicle turns in the leftward direction (when the steering angle θs (deg) is a positive value), while it is set to the negative value when the vehicle turns in the rightward direction (when the steering angle θs is a negative value). This theoretical formula is a formula for calculating a theoretical value of the yaw rate exerted on the vehicle when the vehicle turns with the steering angle and vehicle body speed constant (upon the normal circular turn).

$$Yrt = (Vso \cdot \theta s)/(n \cdot l) \cdot (1/(1 + Kh \cdot Vso^2)) \quad (1)$$

In the above formula (1), Vso is a calculated estimated body speed (m/s) as described later. Further, n is a gear ratio (constant value) that is a ratio of a change amount of a rotation angle of the steering 21 to a change amount of a turning angle of the steering wheels FL and FR, l is a wheel base (m) of the vehicle that is a constant value determined by the vehicle body, and Kh is a stability factor ($s^2/m^2$) that is a constant value determined by the vehicle body.

Subsequently, this device calculates a yaw rate deviation ΔYr (deg/sec), based upon the formula (2) described later, that is a deviation between the target yaw rate Yrt calculated as described above and the actual yaw rate Yr obtained by the yaw rate sensor 56.

$$\Delta Yr = Yrt - Yr \quad (2)$$

When the yaw rate deviation ΔYr is greater than a positive predetermined value (a value Yrth), the vehicle is in a state where the turning radius is greater than the turning radius of when the target yaw rate Yrt is assumed to be caused on the vehicle (i.e., when the turning state of the vehicle is in the target state) (hereinafter referred to as "understeer state"), whereby this device judges that the vehicle is in the understeer state and executes an understeer restraining control for restraining the understeer state.

On the other hand, when the yaw rate deviation ΔYr is not more than a negative predetermined value (a value−Yrth), the vehicle is in a state where the turning radius is smaller than the turning radius of when the target yaw rate Yrt is assumed to be caused on the vehicle (i.e., when the turning state of the vehicle is in the target state) (hereinafter referred to as "oversteer state"), whereby this device judges that the vehicle is in the oversteer state and executes an oversteer restraining control for restraining the oversteer state. As described above, the means for obtaining that the vehicle turning state is in the understeer state or in the oversteer state corresponds to turning state obtaining means.

[Outline of Understeer Restraining Control and Oversteer Restraining Control]

In order to restrain the understeer state, in general, braking force by brake fluid pressure is exerted on only the rear wheel at the inner side of the turning direction to thereby produce a yawing moment on the vehicle in the direction same as the turning direction. On the contrary, in order to restrain the oversteer state, braking force by brake fluid pressure is exerted on only the front wheel at the outer side of the turning direction to thereby produce a yawing moment on the vehicle in the direction opposite to the turning direction. Specifically, braking force by brake fluid pressure is exerted on only one wheel of one circuit, of the above-mentioned dual circuit brake conduit, to which the front wheel at the outer side of the turning direction and the rear wheel at the inner side of the turning direction belong.

However, as previously explained, it is preferable that the vehicle is decelerated to effectively reduce the centrifugal force exerted on the vehicle upon executing the understeer restraining control or the oversteer restraining control (accordingly, upon bringing the vehicle turning state into the aforesaid target state). Therefore, this device exerts, in principle, brake fluid pressure on two wheels that belong to one circuit of the dual circuit brake conduit to which the front wheel at the outer side of the turning direction and the rear wheel at the inner side of the turning direction belong.

Figure 3:
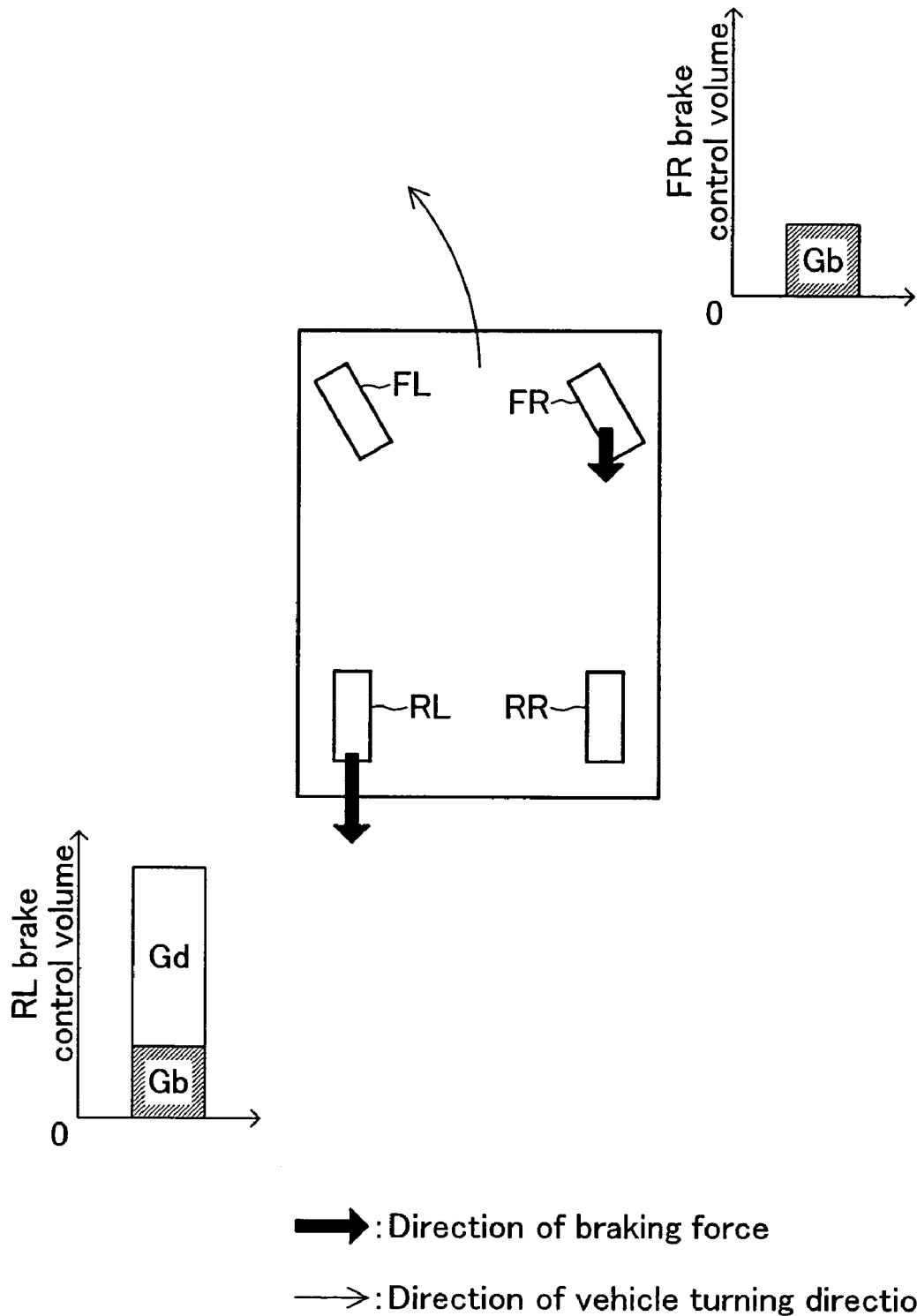
FIG. 3 is a view showing one example of braking force exerted on each wheel of the vehicle that turns in the leftward direction during an understeer restraining control.

Firstly explained more specifically is the understeer restraining control. As shown in FIG. 3 that represents one example of the braking force exerted on each wheel of the vehicle that turns in the leftward direction, this device exerts braking force by the brake fluid pressure according to the basic control volume Gb calculated as described later for decelerating the vehicle on the front wheel at the outer side of the turning direction (the wheel FR in FIG. 3). At the same time, this device exerts braking force by the brake fluid pressure, that is obtained by adding braking force by brake fluid pressure according to yaw control volume Gd calculated as described later for producing the yawing moment on the vehicle to the braking force by the brake fluid pressure according to the basic control volume Gb, on the rear wheel at the inner side of the turning direction (the wheel RL in FIG. 3).

This allows to make the braking force exerted on the rear wheel at the inner side of the turning direction greater than that exerted on the front wheel at the outer side of the turning direction, thereby forcibly producing a yawing moment on the vehicle in the direction same as the turning direction (in the counterclockwise direction in FIG. 3). This can increase the absolute value of the actual yaw rate Yr, whereby the actual yaw rate Yr is controlled to be close to the target yaw rate Yrt. Further, the total sum of the braking forces exerted on the wheel (the braking force obtained by adding the braking force by the brake fluid pressure according to the yaw control volume Gd to the braking force that is double of the braking force by the brake fluid pressure according to the basic control volume Gb) becomes greater than the total sum of the braking forces (i.e., only the braking force by the brake fluid pressure according to the yaw control volume Gd) in case where the braking force by the brake fluid pressure is exerted on only one wheel of the aforesaid one circuit, whereby the vehicle is effectively decelerated.

On the other hand, in case where the oversteer restraining control is executed, this device exerts braking force by brake fluid pressure according to the basic control volume Gb on the rear wheel at the inner side of the turning direction. At the same time, this device exerts, on the front wheel at the outer side of the turning direction, braking force by the brake fluid pressure obtained by adding the braking force by the brake fluid pressure according to the yaw control volume Gd to the braking force by the brake fluid pressure according to the basic control volume Gb.

This allows to make the braking force exerted on the front wheel at the outer side of the turning direction greater than that exerted on the rear wheel at the inner side of the turning direction, thereby forcibly producing a yawing moment on the vehicle in the direction opposite to the turning direction. This can decrease the absolute value of the actual yaw rate Yr, whereby the actual yaw rate Yr is controlled to be close to the target yaw rate Yrt. Further, the total sum of the braking force increases, thereby effectively decelerating the vehicle, like the above-mentioned case of executing the understeer restraining control.

As described above, this device produces a predetermined yawing moment, that is for bringing the vehicle turning state into the target state, on the vehicle by executing the understeer restraining control or the oversteer restraining control (hereinafter generically referred to as "brake steering control"). The means for producing the predetermined yawing moment on the vehicle as described above corresponds to the turning state control means.

[Calculation of Basic Control Volume Gb)

Subsequently explained is the calculation of the basic control volume Gb used for calculating the braking force for decelerating the vehicle. As previously explained, the centrifugal force exerted on the vehicle is proportional to the square of the vehicle body speed, so that the increasing amount of the centrifugal force exerted on the vehicle to the increase in the vehicle body speed increases with the vehicle body speed. Accordingly, as the vehicle body speed increases, a degree of a demand for reducing the vehicle body speed increases. Further, as the road friction coefficient increases, the maximum braking force that can be produced on a tire increases, thereby being capable of more effectively decelerating the vehicle.

Figure 4:
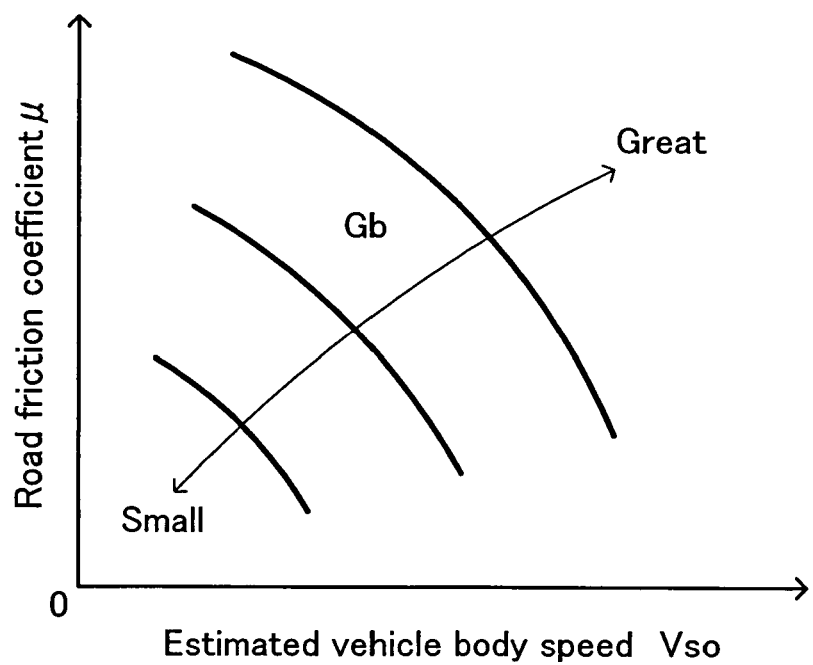
FIG. 4 is a graph that is referred to by the CPU shown in FIG. 1 and that defines a relationship between an estimated vehicle body speed as well as road friction coefficient and basic control volume for decelerating the vehicle.

Therefore, this device calculates the basic control volume Gb based upon the estimated vehicle body speed Vso calculated as described later, road friction coefficient μ calculated as described later and a table shown in FIG. 4 that defines the relationship between the estimated vehicle body speed Vso as well as the road friction coefficient μ and the basic control volume Gb. By this, the more the estimated vehicle body speed Vso or the road friction coefficient μ increases, the greater the calculated basic control volume Gb becomes. The means for calculating the basic control volume Gb corresponds to the basic control volume calculating means.

(Calculation of Yaw Control Volume Gd)

Subsequently explained is the calculation of the yaw control volume Gd used for calculating the braking force that is for producing the yawing moment on the vehicle. This device calculates the yaw control volume Gd based upon the yaw rate deviation ΔYr and a table shown in FIG. 5 that defines the relationship between the yaw rate deviation ΔYr and the yaw control volume Gd.

By this, the yaw control volume Gd is set to "0" when the yaw rate deviation ΔYr is not more than the value Yrth. On the other hand, it is set so as to linearly change from "0" to an upper limit value Gmax as the yaw rate deviation ΔYr is changed from the value Yrth to a value Yr1 when the yaw rate deviation ΔYr is not less than the value Yrth and not more than the value Yr1. Further, it is set so as to keep the upper limit value Gmax when the yaw rate deviation ΔYr is not less than the value Yr1. As described above, the yaw control volume Gd is determined according to the yaw rate deviation ΔYr when the yaw rate deviation ΔYr is not less than the value Yrth. The means for calculating the yaw control volume Gd corresponds to the yaw control volume calculating means.

[Limitation of Basic Control Volume Gb Based Upon Preventing Occurrence of Excessive Pitching]

In general, there is a tendency that a magnitude of a pitching generated on the vehicle body increases according to the increasing speed of the decelerating force exerted on the vehicle (accordingly, the basic control volume Gb). On the other hand, as the vehicle body speed (estimated body speed Vso) increases, a degree of a demand for preventing the excessive pitching generally increases. Moreover, as the road friction coefficient increases, the excessive pitching is liable to be produced.

Figure 6:
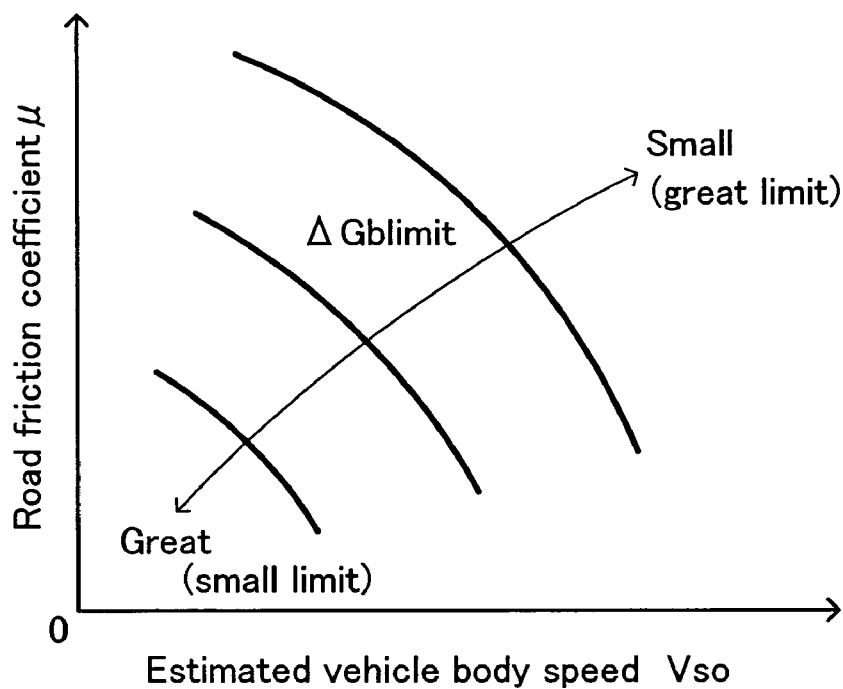
FIG. 6 is a graph that is referred to by the CPU shown in FIG. 1 and that defines a relationship between an estimated vehicle body speed as well as road friction coefficient and basic control volume changing amount limiting value for limiting the changing speed of the basic control volume.

Therefore, this device calculates a basic control volume changing amount limiting value ΔGblimit based upon the estimated vehicle body speed Vso, road friction coefficient μ and a table shown in FIG. 6 that defines the relationship between the estimated vehicle body speed Vso as well as the road friction coefficient μ and the basic control volume changing amount limiting value ΔGblimit. By this, the more the estimated vehicle body speed Vso or the road friction coefficient μ increases, the smaller the calculated basic control volume changing amount limiting value ΔGblimit becomes. When the value obtained by subtracting the last-time value Gbb of the basic control volume from the basic control volume (its this-time value) Gb based upon the table shown in FIG. 4 is greater than the basic control volume changing amount limiting value ΔGblimit, this device corrects (limits) the this-time value Gb of the basic control volume to a value obtained by adding the basic control volume changing amount limiting value ΔGblimit to the last-time value Gbb of the basic control volume.

[Limitation of Basic Control Volume Gb Based Upon Upper Limit of Total Sum of Braking Forces by Brake Fluid Pressure]

The road friction force (accordingly, the braking force) produced on a tire is limited to some value (upper limit value) according to the road friction coefficient. Therefore, when braking force exceeding the upper limit value is exerted on the tire, the tire is tend to be locked, with the result that the vehicle is liable to be unstable. From this viewpoint, the sum of the braking forces according to the yaw control volume Gd and the basic control volume Gb should be limited to some value.

In case where the sum of the braking forces is limited in this way, it is considered to be preferable that priority should be given to the generation of the predetermined yawing moment on the vehicle for bringing the turning state of the vehicle into the target state and the braking force according to the basic control volume should be more limited than the braking force according to the yaw control volume Gd.

Therefore, when the sum of the braking forces, i.e., the value (Gb+Gd) obtained by adding the calculated yaw control volume Gd to the calculated (and limited) basic control volume Gb, exceeds the upper limit value Gmax (see FIG. 5), this device corrects (limits) the basic control volume Gb in accordance with a formula (3) described below for making the sum of the braking forces equal to the upper limit value Gmax.

$$Gb=Gmax-Gd \quad (3)$$

[Positive Use of Reduction in Output of Engine]

When the output of the engine 31 of the vehicle is lowered, the braking force corresponding to the reduction in the output of the engine 31 is substantially acted on the driving wheels (two front wheels) of the vehicle. Further, it entails an increase in consumed energy to decelerate the vehicle by the braking force by the brake fluid pressure while maintaining the output (accordingly, driving force) from the engine 31 in case where the vehicle is accelerated by the output.

Figure 7:
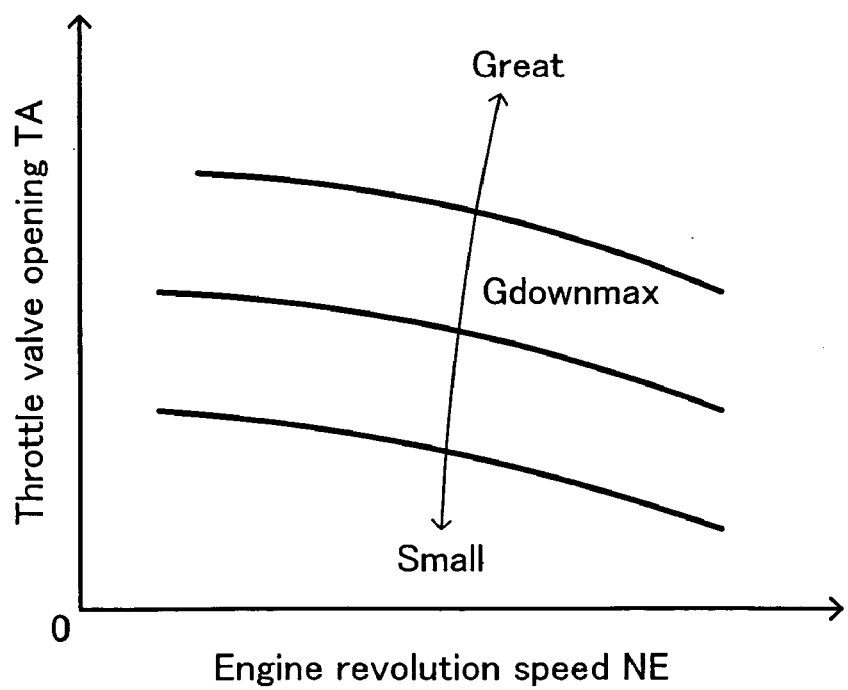
FIG. 7 is a graph that is referred to by the CPU shown in FIG. 1 and that defines a relationship between an engine revolution speed as well as throttle valve opening and control volume corresponding to an adjustable maximum output reduction amount.

Therefore, this device calculates control volume Gdownmax corresponding to an adjustable maximum output reduction amount based upon the engine revolution speed NE obtained by the revolution speed sensor 57, temporary target throttle valve opening TAt0 described later determined according to the operation amount Accp of the accelerator pedal by a driver and a table shown in FIG. 7 that defines a relationship between the engine revolution speed NE as well as the throttle valve opening TA and the control volume Gdownmax corresponding to the adjustable maximum output reduction amount. By this, the more the temporary throttle valve opening TAt0 and engine revolution speed NE increases, the greater the calculated control volume Gdownmax corresponding to the adjustable maximum output reduction amount becomes.

Then, this device sets, in principle, the value obtained by subtracting the control volume Gdownmax corresponding to the adjustable maximum output reduction amount from the calculated (and limited) basic control volume Gb as the final basic control volume Gb. Simultaneously, this device sets the value of the control volume Gdownmax corresponding to the adjustable maximum output reduction amount as the output reduction amount of the engine 31 that should be adjusted (adjusted output reduction amount Gdown), thereby lowering the output of the engine 31 by an amount corresponding to the adjusted output reduction amount Gdown from the value according to the operation amount Accp of the accelerator pedal. This can prevent the increase in the consumed energy without changing the total sum of the braking forces exerted on wheels as decelerating force for decelerating the vehicle.

As described above, upon executing the above-mentioned brake steering control, this device calculates the basic control volume Gb and yaw control volume Gd and suitably corrects the basic control volume Gb to obtain the final basic control volume Gb, whereby braking force by the predetermined brake fluid pressure is exerted, based upon these final basic control volume Gb and the yaw control volume Gd, on two wheels of one circuit to which the front wheel at the outer side of the turning direction and the rear wheel at the inner side of the turning direction belong.

Further, when any one of an anti-skid control, front-rear braking force distribution control and traction control described later is also required to be executed upon executing the brake steering control, this device finally determines the braking force that should be exerted on each wheel by considering also the braking force that should be exerted on each wheel for executing any one of the above-mentioned controls. The above description is about the outline of the vehicle motion control.

(Actual Operation)

Subsequently, the actual operation of the vehicle control device 10 of the present invention and having the above-mentioned construction will be explained hereinbelow with reference to FIGS. 8 to 14 showing routines with flowcharts executed by the CPU 61 of the electrical control apparatus 60. The symbol "" marked at the end of the various variables, flags, symbols or the like is a comprehensive expression of "fl", "fr" or the like marked at the end of the various variables, flags or symbols for showing which wheel such as FR or the like is related to the various variables, flags, symbols or the like. For example, the wheel speed Vw comprehensively represents the front-left wheel speed Vwfl, front-right wheel speed Vwfr, rear-left wheel speed Vwrl and rear-right wheel speed Vwrr.

Figure 8:
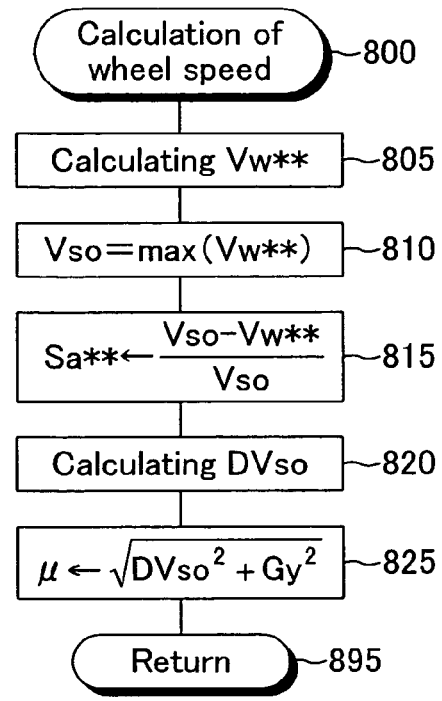

The CPU 61 repeatedly executes a routine shown in FIG. 8 for calculating the wheel speed Vw or the like once every predetermined period. Accordingly, the CPU 61 starts the process from a step 800 at a predetermined timing, and then proceeds to a step 805 to respectively calculate the wheel speed (outer peripheral speed of each wheel) Vw of each wheel FR or the like. Specifically, the CPU 61 calculates the respective wheel speeds Vw of each wheel FR or the like based upon a time interval of a pulse possessed by a signal outputted from each wheel speed sensor 51.

Then, the CPU 61 moves to a step 810 to calculate the maximum value among the wheel speeds Vw of each wheel FR as the estimated body speed Vso. It is to be noted that the average value of the wheel speeds Vw of each wheel FR may be calculated as the estimated body speed Vso.

Then, the CPU 61 moves to a step 815 to calculate an actual slip ratio Sa of every wheel based upon the estimated body speed Vso, the value of the wheel speeds Vw of each wheel FR or the like and the formula described in the step 815. This actual slip ratio Sa** is used for calculating the braking force that should be exerted on each wheel as described later.

Then, the CPU 61 proceeds to a step 820 for calculating an estimated vehicle body acceleration DVso that is a time derivative value of the estimated body speed Vso based upon a formula (4) described later.

$$DVso=(Vso-Vso1)/\Delta t \quad (4)$$

In the formula (4), Vso1 is the previous estimated body speed calculated at the step 810 at the time of the previous execution of this routine, while $\Delta t$ is the above-mentioned predetermined time that is the operation period of this routine. Then, the CPU 61 moves to a step 825 to calculate the road friction coefficient μ based upon the estimated vehicle body acceleration DVso, actual lateral acceleration Gy obtained from the lateral acceleration sensor 54 and a formula described in the step 825. Then, the CPU moves to a step 895 to temporary terminate this routine.

Subsequently explained is the calculation of the yaw rate deviation. The CPU 61 repeatedly executes a routine shown in FIG. 9 once every predetermined period. Accordingly, the CPU 61 starts the process from a step 900 at a predetermined timing, and then proceeds to a step 905 to calculate the target yaw rate Yrt based upon the steering angle θs obtained by the steering sensor 52, estimated vehicle body speed Vso and a formula described in the step 905 and corresponding to the right side of the formula (1).

Then, the CPU proceeds to a step 910 to calculate the yaw rate deviation ΔYr based upon the target yaw rate Yrt, actual yaw rate Yr obtained by the yaw rate sensor 56 and a formula described in the step 910 and corresponding to the right side of the formula (2). Then, the CPU moves to a step 995 to temporary terminate this routine.

Subsequently explained is the calculation of the brake control volume used upon executing the brake steering control, i.e., the calculation of the above-mentioned (final) basic control volume Gb and yaw control volume Gd. The CPU 61 repeatedly executes a routine shown in FIG. 10 once every predetermined period. Accordingly, the CPU 61 starts the process from a step 1000 at a predetermined timing, and then proceeds to a step 1005 to determine whether the absolute value of the yaw rate deviation ΔYr is greater than the value Yrth, i.e., whether the brake steering control is needed or not. If the determination is "NO", the CPU 61 proceeds to a step 1090 to set the (final) basic control volume (its this-time value) Gb, yaw control volume Gd, the last-time value Gbb of the (final) basic control volume and adjusted output reduction amount Gdown to "0", and then, immediately proceeds to a step 1095 to temporarily terminate this routine.

Figure 5:
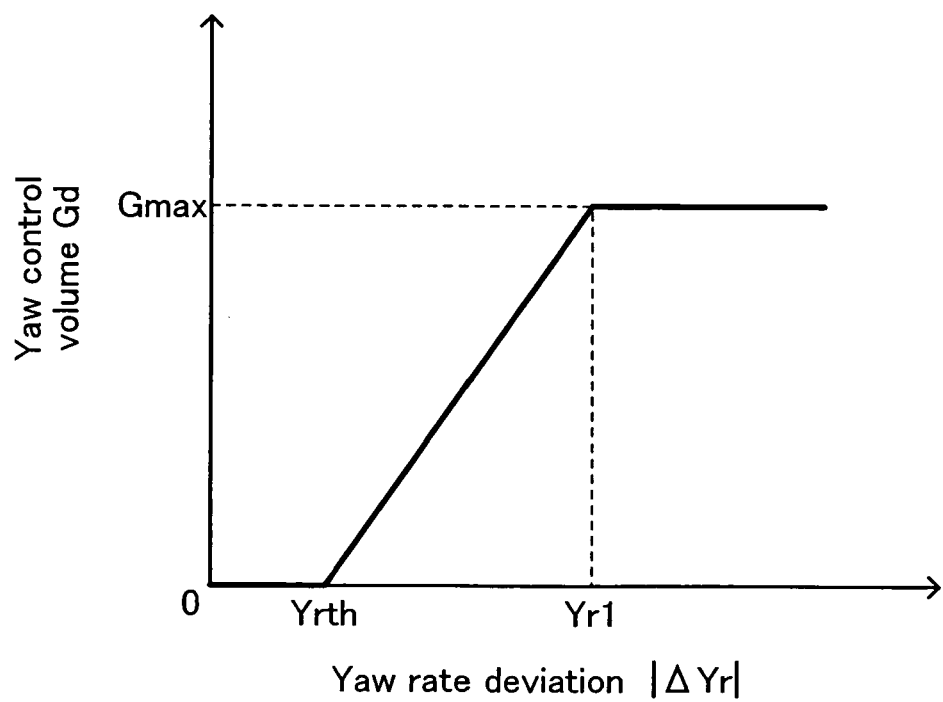
FIG. 5 is a graph that is referred to by the CPU shown in FIG. 1 and that defines a relationship between a yaw rate deviation and yaw control volume for generating a yawing moment.

On the other hand, if the brake steering control is needed, the CPU 61 makes "YES" determination at the step 1005, and then, moves to a step 1010 to obtain the yaw control volume Gd based upon the absolute value of the yaw rate deviation ΔYr and a function f corresponding to the table shown in FIG. 5. Subsequently, the CPU 61 moves to a step 1015 to obtain the yaw control volume Gd based upon the estimated vehicle body speed Vso, road friction coefficient μ and a function g corresponding to the table shown in FIG. 4.

Then, the CPU 61 moves to a step 1020 to obtain the basic control volume changing amount limiting value ΔGlimit based upon the estimated vehicle body speed Vso, road friction coefficient μ and a function h corresponding to the table shown in FIG. 6. Then, the CPU 61 proceeds to a step 1025 to determine whether the value obtained by subtracting the last-time value Gbb of the basic control volume renewed at the step 1090 or a step 1085 described later upon the previous execution of this routine from the basic control volume (its this-time value) Gb obtained at the step 1015 is greater than the basic control volume changing amount limiting value ΔGlimit or not. If the determination is "NO", the CPU immediately proceeds to a step 1035.

On the other hand, if the determination is "YES" at the step 1020, the CPU 61 moves to a step 1030 to reset, as the basic control volume (its this-time value), the value obtained by adding the basic control volume changing amount limiting value ΔGlimit to the last-time value Gbb of the basic control volume, and then, moves to a step 1035.

When moving to the step 1035, the CPU 61 determines whether the sum of the brake control volumes (Gb+Gd) corresponding to the sum of the braking force according to the yaw control volume Gd and the braking force according to the basic control volume Gb exceeds the upper limit value Gmax or not (see FIG. 5). If the determination is "NO", the CPU immediately proceeds to a step 1055.

On the other hand, if the determination is "YES" at the step 1035, the CPU 61 moves to a step 1040 to reset the basic control volume Gb such that the sum of the brake control volumes becomes equal to the upper limit value Gmax according to the formula described in the step 1040 that corresponds to the formula (3). In case where the reset basic control volume Gb is a negative value at a following step 1045, the CPU 61 moves to a step 1050 to set the basic control volume Gb to "0", and then, moves to the step 1055. This can prevent that the basic control volume Gb is set to a negative value.

When moving to the step 1055, the CPU 61 obtains the control volume Gdownmax corresponding to the adjustable maximum output reduction amount based upon the engine revolution speed NE, the latest temporary throttle valve opening TAt0 set at a routine described later and a function j corresponding to the table shown in FIG. 7. Then, the CPU 61 moves to a step 1060 to determine whether the basic control volume Gb at present is greater than the control volume Gdownmax corresponding to the adjustable maximum output reduction amount.

If the CPU 61 makes "YES" determination in the judgement at the step 1060, it proceeds to a step 1065 to set, as the adjusted output reduction amount Gdown, the control volume Gdownmax corresponding to the adjustable maximum output reduction amount as it is, and then, sets, as the final basic control volume Gb, the value obtained by subtracting the control volume Gdownmax corresponding to the adjustable maximum output reduction amount from the basic control volume Gb at this point at a following step 1070. Thereafter, the CPU 61 moves to a step 1085.

If the CPU 61 makes "NO" determination in the judgement at the step 1060, it proceeds to a step 1075 to set, as the adjusted output reduction amount Gdown, the basic control volume Gb at present as it is, and then, sets the final basic control volume Gb to "0" at a following step 1080. Thereafter, the CPU 61 moves to the step 1085.

When moving to the step 1085, the CPU 61 sets and renews the final basic control volume (its this-time value) Gb as the last-time value Gbb of the basic control volume, and then, proceeds to the step 1095 to temporarily terminate this routine.

Subsequently explained is the calculation of the target slip ratio of each wheel required to determine the braking force that should be exerted on each wheel upon executing only the brake steering control. The CPU 61 repeatedly executes a routine shown in FIG. 11 once every predetermined period. Accordingly, the CPU 61 starts the process from a step 1100 at a predetermined timing, and then proceeds to a step 1105 to determine whether the actual yaw rate Yr obtained by the yaw rate sensor 56 is not less than "0" or not. If the actual yaw rate is not less than "0", the CPU 61 makes "YES" determination at the step 1105, and then, moves to a step 1110 to set a turning direction indicating flag L to "1". If the actual yaw rate Yr is a negative value, it makes "NO" determination at the step 1105, and then, proceeds to a step 1115 to set the turning direction indicating flag L to "0".

The turning direction indicating flag L represents here that the vehicle turns in the leftward direction or rightward direction. When the value thereof is "1", it indicates that the vehicle turns in the leftward direction, while it indicates that the vehicle turns in the rightward direction when the value thereof is "1". Accordingly, the turning direction of the vehicle is specified by the value of the turning direction indicating flag L.

Figure 9:
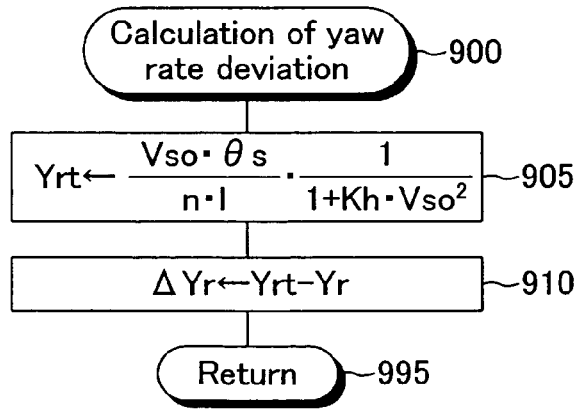
FIG. 9 is a flowchart executed by the CPU shown in FIG. 1 for calculating a yaw rate deviation.

Then, the CPU 61 proceeds to a step 1120 to determine whether the yaw rate deviation ΔYr calculated at the step 910 in FIG. 9 is not less than "0" or not. If the yaw rate deviation ΔYr is not less than "0" (actually, if the yaw rate deviation ΔYr is not less than the value Yrth), the CPU 61 judges that the vehicle is in the understeer state as previously explained, whereby it moves to a step 1125 to determine whether the turning direction indicating flag L is "1" or not for calculating the target slip ratio of each wheel upon executing the understeer restraining control.

When the turning direction indicating flag L is "1" in the judgement of the step 1125, the CPU 61 proceeds to a step 1135 to set a value obtained by multiplying a coefficient Kf that is a positive constant value by the value of the final basic control volume Gb as the target slip ratio Stfr of the front-right wheel FR, set a value obtained by multiplying a coefficient Kr that is a positive constant value by the value of the sum of the final basic control volume Gb and the yaw control volume Gd as the target slip ratio Strl of the rear-left wheel RL and set the target slip ratios Stfl of the front-left wheel FL and Strr of the rear-right wheel RR to "0". Then, the CPU 61 proceeds to a step 1195 to temporary terminate this routine.

On the other hand, when the turning direction indicating flag L is "0" at the judgement of the step 1125, the CPU 61 moves to a step 1135 to set a value obtained by multiplying the coefficient Kf by the value of the final basic control volume Gb as the target slip ratio Stfl of the front-left wheel FL, set a value obtained by multiplying the coefficient Kr by the value of the sum of the final basic control volume Gb and the yaw control volume Gd as the target slip ratio Strr of the rear-right wheel RR and set the target slip ratios Sffr of the front-right wheel FR and Strl of the rear-left wheel RL to "0". Then, the CPU 61 proceeds to the step 1195 to temporary terminate this routine.

This process allows to set the target slip ratio corresponding to the sum of the final basic control volume Gb and the yaw control volume Gd to the rear wheel at the inner side of the turning direction and set the target slip ratio corresponding only to the final basic control volume Gb on the front wheel at the outer side of the turning direction, upon executing the understeer restraining control.

On the other hand, if the yaw rate deviation ΔYr is a negative value (actually, if the yaw rate deviation ΔYr is not more than the value−Yrth) in the judgement at the step 1120, the CPU 61 judges that the vehicle is in the oversteer state as previously explained, whereby it moves to a step 1140 to determine whether the turning direction indicating flag L is "1" or not for calculating the target slip ratio of each wheel upon executing the oversteer restraining control.

When the turning direction indicating flag L is "1" in the judgement of the step 1140, the CPU 61 proceeds to a step 1145 to set a value obtained by multiplying the coefficient Kf by the value of the sum of the final basic control volume Gb and the yaw control volume Gd as the target slip ratio Sffr of the front-right wheel FR, set a value obtained by multiplying the coefficient Kr by the value of the final basic control volume Gb as the target slip ratio Strl of the rear-left wheel RL and set the target slip ratios Stfl of the front-left wheel FL and Strr of the rear-right wheel RR to "0". Then, the CPU 61 proceeds to the step 1195 to temporary terminate this routine.

On the other hand, when the turning direction indicating flag L is "0" at the judgement of the step 1140, the CPU 61 moves to a step 1150 to set a value obtained by multiplying the coefficient Kf by the value of the sum of the final basic control volume Gb and the yaw control volume Gd as the target slip ratio Stfl of the front-left wheel FL, set a value obtained by multiplying the coefficient Kr by the value of the final basic control volume Gb as the target slip ratio Strr of the rear-right wheel RR and set the target slip ratios Sffr of the front-right wheel FR and Strl of the rear-left wheel RL to "0". Then, the CPU 61 proceeds to the step 1195 to temporary terminate this routine.

This process allows to set the target slip ratio corresponding to the sum of the final basic control volume Gb and the yaw control volume Gd to the front wheel at the outer side of the turning direction and set the target slip ratio corresponding only to the final basic control volume Gb on the rear wheel at the inner side of the turning direction, upon executing the oversteer restraining control. As described above, the target slip ratio of each wheel required to determine the braking force that should be exerted on each wheel upon executing only the brake steering control is determined.

Subsequently explained is a setting of a control mode of the vehicle. The CPU 61 repeatedly executes a routine shown in FIG. 12 once every predetermined period. Accordingly, the CPU 61 starts the process from a step 1200 at a predetermined timing, and then proceeds to a step 1205 to determine whether the anti-skid control is necessary or not at the present. The anti-skid control is a control, when a specific wheel is locked with the brake pedal BP operated, for decreasing the braking force of the specific wheel. The detail of the anti-skid control is well-known, so that the detailed explanation thereof is omitted here.

Specifically, at the step 1205, the CPU 61 judges that the anti-skid control is necessary in case where the state that the brake pedal BP is operated is shown by the brake switch 55 and the value of the actual slip ratio Sa of the specific wheel calculated at the step 815 in FIG. 8** is not less than the positive predetermined value.

When the anti-skid control is judged to be necessary at the judgement of the step 1205, the CPU 61 moves to a step 1210 to set "1" to a variable Mode for setting a control mode that simultaneously executes the brake steering control and the anti-skid control, and then, proceeds to the following step 1250.

On the other hand, when the anti-skid control is judged to be unnecessary at the judgement of the step 1205, the CPU 61 moves to a step 1215 to determine whether the front-rear braking force distribution control is required or not at present. The front-rear braking force distribution control is a control for decreasing a ratio (distribution) of the braking force of rear wheels to the braking force of front wheels in accordance with a magnitude of a deceleration in the front-to-rear direction of the vehicle with the brake pedal BP operated. The detail of the front-rear braking force distribution control is well-known, so that the detailed explanation thereof is omitted here.

Specifically, the CPU 61 judges at the step 1215 that the front-rear braking force distribution control is needed, in case where the brake switch 55 shows that the brake pedal BP is operated and the case where the estimated body speed DVso calculated at the step 820 of FIG. 8 is a negative value and its absolute value is not less than the predetermined value.

When the front-rear braking force distribution control is needed in the judgement at the step 1215, the CPU 61 proceeds to a step 1220 where "2" is set to a variable Mode for setting a control mode for executing both the brake steering control and the front-rear braking force distribution control. Then, the CPU 61 proceeds to the next step 1250.

When the front-rear braking force distribution control is not needed in the judgement at the step 1215, the CPU 61 proceeds to a step 1225 for determining whether the traction control is needed or not at present. The traction control is a control for increasing the braking force of the specific wheel or decreasing the driving force of the engine 31 in case where the specific wheel is spun in the direction where the driving force of the engine 31 is generated with the brake pedal BP not operated. The detail of the traction control is well-known, so that the detailed explanation thereof is omitted here.

Specifically, the CPU 61 judges at the step 1225 that the traction control is needed, in case where the brake switch 55 shows that the brake pedal BP is not operated and the case where the actual slip ratio Sa** of the specific wheel calculated at the step 815 of FIG. 8 is a negative value and its absolute value is not less than the predetermined value.

Figure 11:
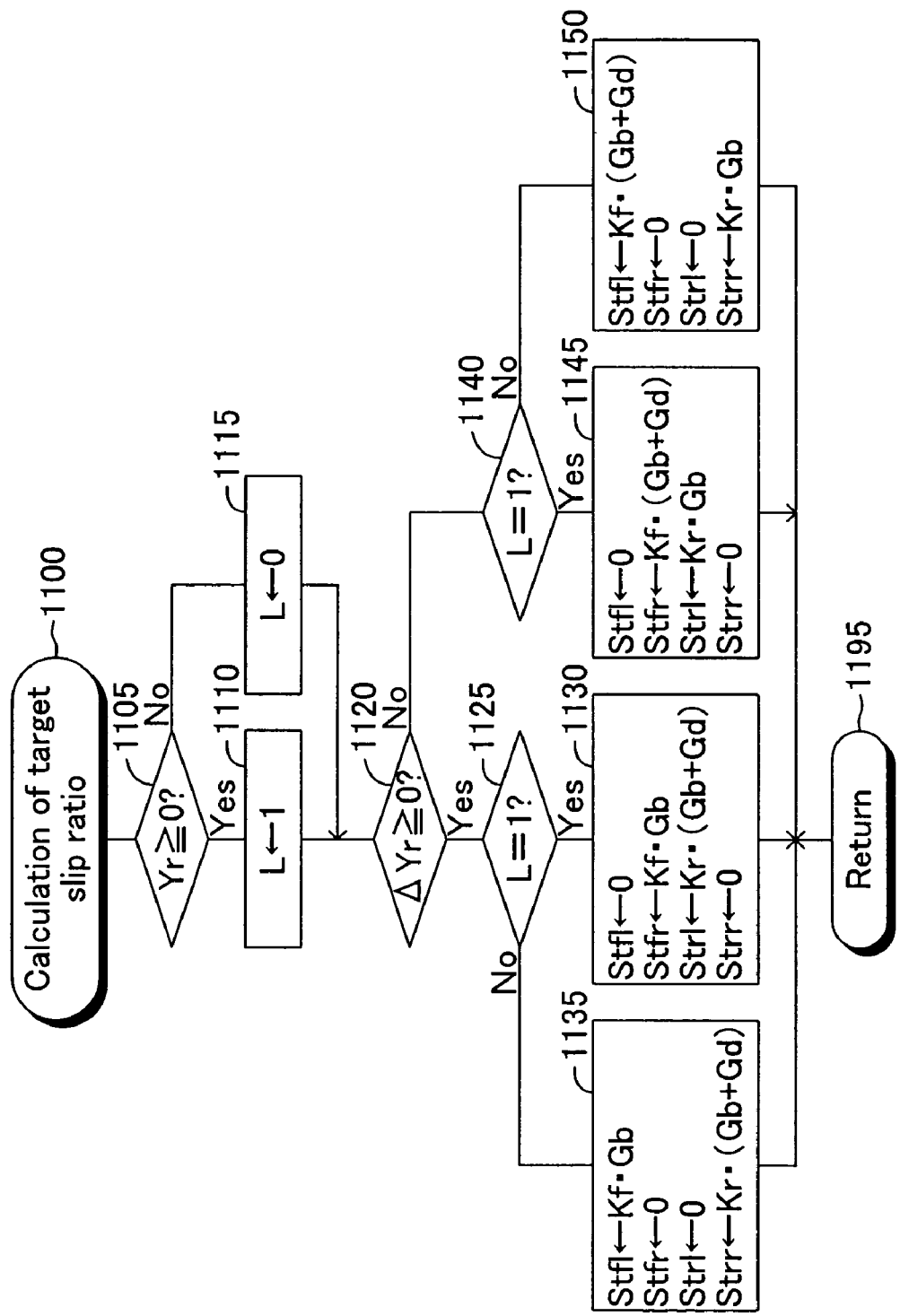
FIG. 11 is a flowchart executed by the CPU shown in FIG. 1 for calculating a target slip ratio.

When the traction control is needed in the judgement at the step 1225, the CPU 61 proceeds to a step 1230 where "3" is set to a variable Mode for setting a control mode that executes both the brake steering control and the traction control. Then, the CPU 61 proceeds to the next step 1250. When the traction control is not needed in the judgement at the step 1225, the CPU 61 proceeds to a step 1235 for determining whether the brake steering control is needed or not at present. Specifically, the CPU 61 determines that the brake steering control is needed at the step 1235 in case where the absolute value of the yaw rate deviation ΔYr is greater than the value Yrth, since there exists the specific wheel wherein the value of the target slip ratio St** set in FIG. 11 is not "0".

When the brake steering control is needed in the judgement at the step 1235, the CPU 61 proceeds to a step 1240 where "4" is set to a variable Mode for setting a control mode executing only the brake steering control. Then, the CPU 61 proceeds to the next step 1250. On the other hand, when it is determined that the brake steering control is not needed in the judgement of the step 1235, the CPU 61 proceeds to a step 1245 where "5" is set to a variable Mode for setting a non-control mode wherein the vehicle motion control is not executed, and then, proceeds to the next step 1250. In this case, the specific wheel that should be controlled is not present.

When the CPU 61 proceeds to the step 1250, it sets "1" to a flag CONT corresponding to a wheel to be controlled, while sets "0" to a flag CONT corresponding to a wheel not to be controlled, that is not the wheel to be controlled. The wheel to be controlled at this step 1250 is a wheel that is required to control at least one of the corresponding pressure increasing valve PU and the pressure decreasing valve PD shown in FIG. 2. After executing the step 1250, the CPU 61 proceeds to a step 1295 for temporarily terminating this routine. As described above, the control mode is specified and the wheel to be controlled is specified.

Subsequently explained is the control of the braking force that should be exerted on each driving wheel. The CPU 61 repeatedly executes the routine shown in FIG. 13 once every predetermined period. Accordingly, the CPU 61 starts the process from a step 1300 at a predetermined timing, and then, proceeds to a step 1305 to determine whether the variable Mode is not "0". If the variable Mode is "0" here, the CPU 61 makes "NO" determination at the step 1305, and then, proceeds to a step 1310 for turning off (non-actuated state) all electromagnetic solenoids in the brake hydraulic control device 40 since the brake control is not required to be executed to each wheel. Thereafter, the CPU 61 moves to a step 1395 to temporarily terminate this routine. This allows to supply to each wheel cylinder W** brake fluid pressure according to the operating force of the brake pedal BP by the driver.

On the other hand, if the variable Mode is not "0" in the judgement at the step 1305, the CPU 61 makes "Yes" determination at the step 1305, and proceeds to a step 1315 for determining whether the variable Mode is "4" or not. If the variable Mode is not "4" (i.e., if the anti-skid control or the like that is other than the brake steering control is needed), the CPU 61 makes "NO" determination at the step 1315, and then, proceeds to a step 1320 for correcting the target slip ratio St of each wheel that is required upon executing only the brake steering control already set in FIG. 11, with respect to the wheel to be controlled wherein the value of the flag CONT is set to "1" at the step 1250 in FIG. 12. Then, the CPU 61 moves to a step 1325. By this process, the target slip ratio St** of each wheel already set in FIG. 11 is corrected, every wheel to be controlled, by the target slip ratio of each wheel required for executing the control that is simultaneously executed with the brake steering control and corresponds to the value of the variable Mode.

If the variable Mode is "4" in the judgement at the step 1315, the CPU 61 makes "YES" determination at the step 1315, and directly moves to the step 1325, since it is unnecessary to correct the target slip ratio St of each wheel already set in FIG. 11. Moving to the step 1325, the CPU 61 calculates a slip ratio deviation ΔSt every wheel to be controlled based upon the value of the target slip ratio St, the value of the actual slip ratio Sa calculated at the step 815 in FIG. 8 and the formula disclosed in the step 1325.

Then, the CPU 61 proceeds to a step 1330 for setting a hydraulic control mode with respect to the wheel to be controlled every wheel to be controlled. Specifically, every wheel to be controlled, the CPU 61 sets the hydraulic control mode to "pressure-up" when the value of the slip ratio deviation ΔSt exceeds the predetermined positive reference value, sets the hydraulic control mode to "keep" when the value of the slip ratio deviation ΔSt is not less than the predetermined negative reference value but not more than the predetermined positive reference value, and sets the hydraulic control mode to "pressure-down" when the value of the slip ratio deviation ΔSt is less than the predetermined negative reference value, based upon the value of the slip ratio deviation ΔSt calculated at the step 1325 every wheel to be controlled and the table disclosed in the step 1330.

Subsequently, the CPU 61 proceeds to a step 1335 where it controls the control valves SA1 and SA2 and the changeover valve STR shown in FIG. 2 based upon the hydraulic control mode set at the step 1330 every wheel to be controlled and further it controls the pressure increasing valve PU and pressure reducing valve PD according to the hydraulic control mode every wheel to be controlled.

Specifically, the CPU 61 controls to set the corresponding pressure increasing valve PU and pressure reducing valve PD to the first position (position in the non-actuated state) with respect to the wheel to be controlled having the hydraulic control mode of "pressure-up", while it controls to set the corresponding pressure increasing valve PU to the second position (position in the actuated state) and the corresponding pressure reducing valve PD to the first position with respect to the wheel to be controlled having the hydraulic control mode of "keep", and further it controls to set the corresponding pressure increasing valve PU and pressure reducing valve PD to the second position (position in the actuated state) with respect to the wheel to be controlled having the hydraulic control mode of "pressure-down".

This operation causes to increase the brake fluid pressure in the wheel cylinder W of the wheel to be controlled having the hydraulic control mode of "pressure-up", while to decrease the brake fluid pressure in the wheel cylinder W of the wheel to be controlled having the hydraulic control mode of "pressure-down", whereby each wheel to be controlled is controlled such that the actual slip ratio Sa of each wheel to be controlled approaches to the target slip ratio St. Consequently, the control corresponding to the control mode set in FIG. 12 can be achieved.

Figure 12:
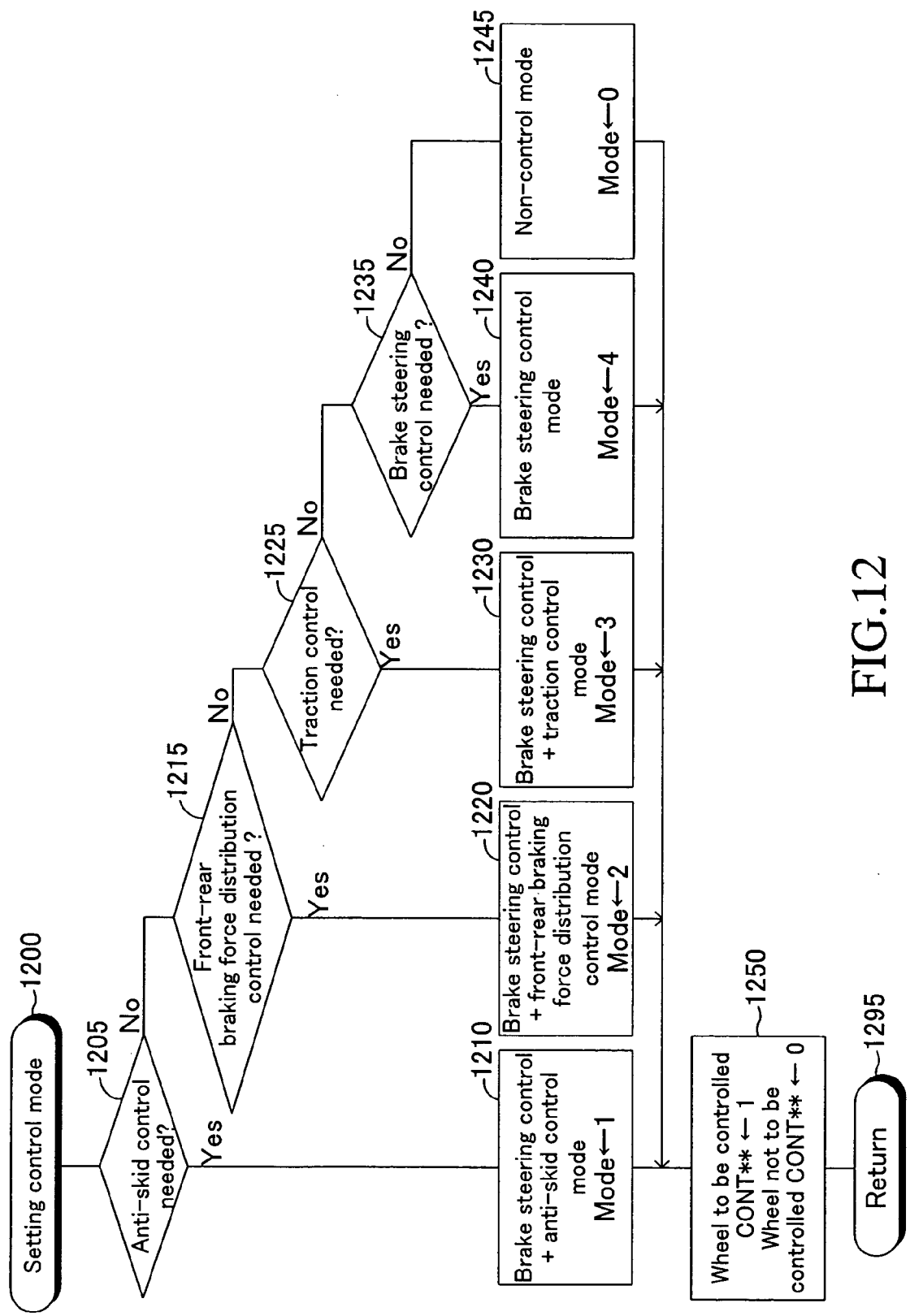
FIG. 12 is a flowchart showing a routine executed by the CPU shown in FIG. 1 for setting a control mode.
Figure 13:
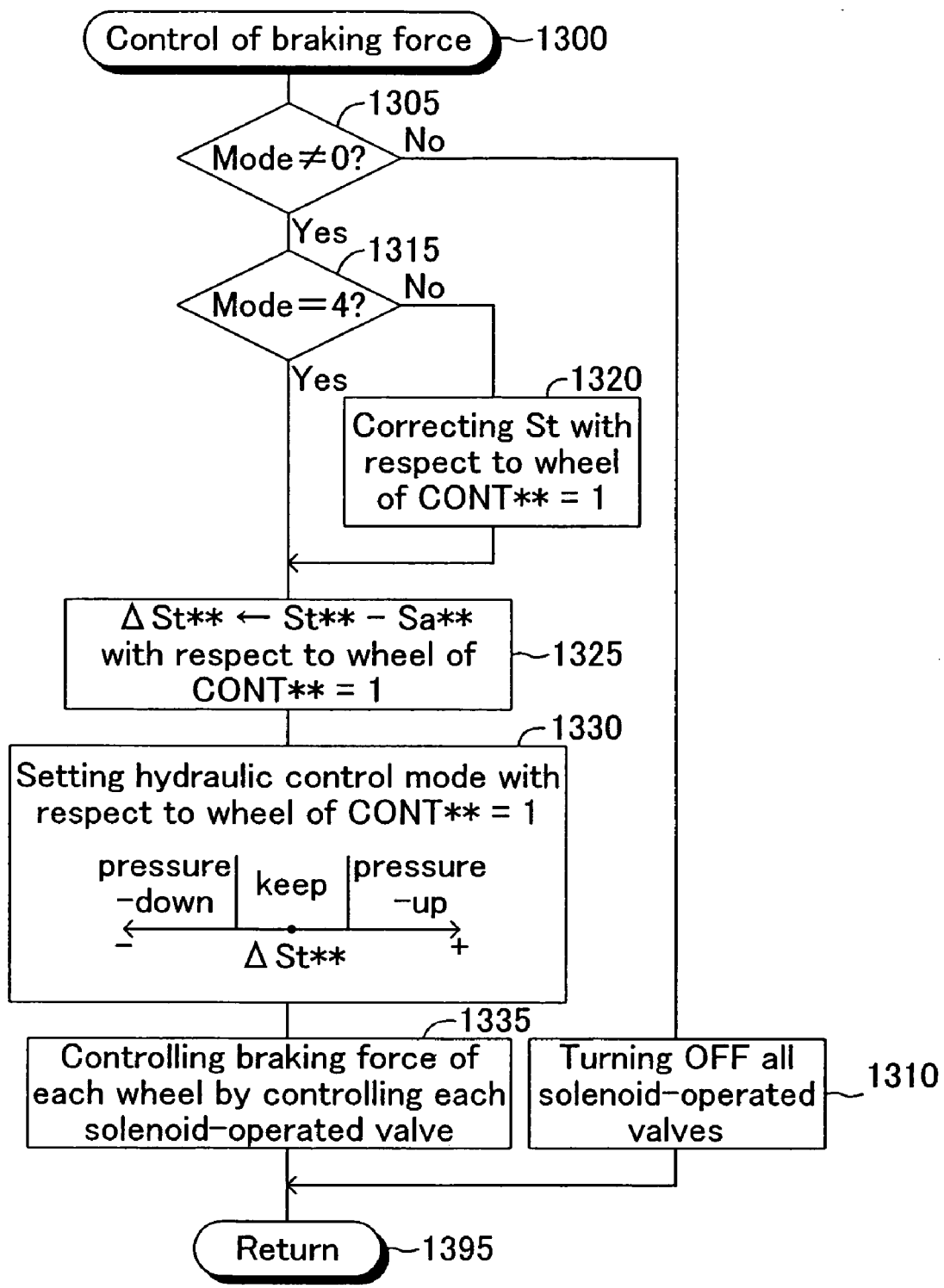
FIG. 13 is a flowchart showing a routine executed by the CPU shown in FIG. 1 for controlling braking force exerted on each wheel.
Figure 14:
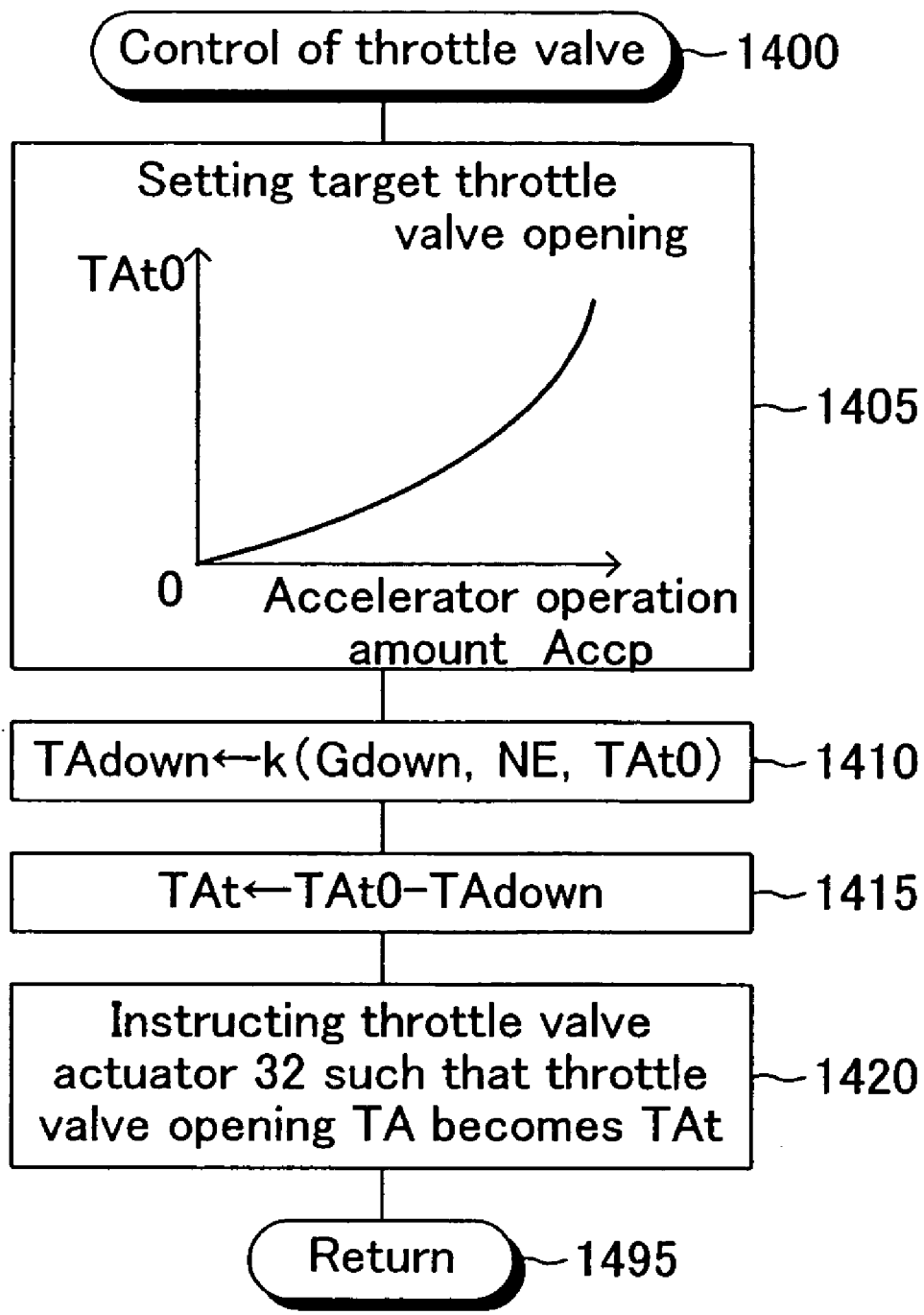
FIG. 14 is a flowchart executed by the CPU shown in FIG. 1 for controlling the throttle valve opening.

It is to be noted that, when the control mode set by the execution of the routine of FIG. 12 is the control mode (variable Mode=3) for executing the traction control mode, the CPU 61 controls, according to need, the throttle valve actuator 32 such that the opening TA of the throttle valve TH becomes smaller than the opening according to the operation amount Accp of the accelerator pedal by a predetermined amount. Then, the CPU 61 proceeds to the step 1395 for temporarily terminating this routine.

Finally explained is the control of the throttle valve TH. The CPU 61 repeatedly executes the routine shown in FIG. 14 once every predetermined period. Accordingly, the CPU 61 starts the process from a step 1400 at a predetermined timing, and then, proceeds to a step 1405 to obtain the above-mentioned temporary target throttle valve opening TAt0 based upon the accelerator operation amount Accp detected by the accelerator opening sensor 53 and a table described in the step 1405. This allows to set the temporary target throttle valve opening TAt0 to a value according to the accelerator operation amount Accp by a driver.

Figure 10:
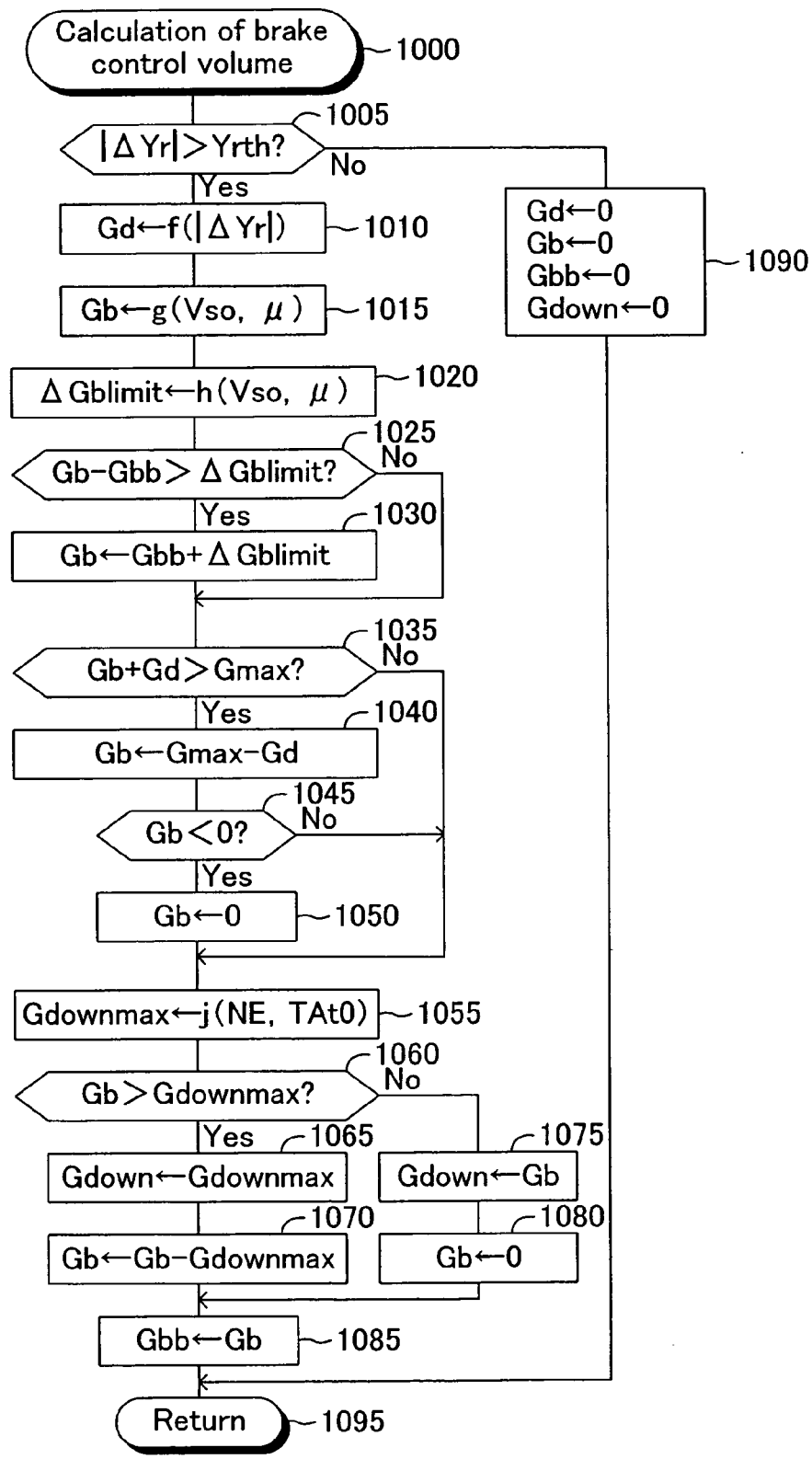
FIG. 10 is a flowchart executed by the CPU shown in FIG. 1 for calculating braking control volume.

Then, the CPU 61 moves to a step 1410 to obtain the throttle valve opening adjusting amount TAdown based upon the latest adjusted output reduction amount Gdown set at the step 1065 or at the step 1075 in FIG. 10, engine revolution speed NE, temporary target throttle valve opening TAt0 and a function k that obtains the throttle valve opening adjusting amount TAdown with these three variables as factors. The function k is a function that becomes "0" when the adjusted output reduction amount Gdown is "0" and that takes a value increasing with the increase in the adjusted output reduction amount Gdown.

Then, the CPU 61 moves to a step 1415 to set, as the target throttle valve opening TAt, the value obtained by subtracting the throttle valve opening adjusting amount TAdown from the temporary target throttle valve opening TAt0, and then, at a following step 1420, supplies a driving signal to the throttle valve actuator 32 such that the actual throttle valve opening TA becomes the target throttle valve opening TAt. Then, the CPU 61 moves to a step 1495 to temporarily terminate this routine.

As described above, the actual throttle valve opening TA is controlled, in principle, to be the temporary target throttle valve opening TAt0 according to the accelerator operation amount Accp and when the adjusted output reduction amount Gdown is greater than "0", it is controlled to be an opening smaller than the temporary target throttle valve opening TAt0 by an amount corresponding to the adjusted output reduction amount Gdown (i.e., by the throttle valve adjusting amount TAdown).

As explained above, when a yawing moment for bringing the vehicle turning state into the target state is produced on the vehicle, i.e., when (only) the brake steering control is executed, the vehicle motion control device of the present invention exerts braking force by brake fluid pressure on two wheels of one circuit, of the above-mentioned dual circuit in the so-called "X-conduit", to which the front wheel at the outer side of the turning direction and the rear wheel at the inner side of the turning direction belong. Accordingly, the total sum of the braking forces exerted on wheels can be great compared to the case where braking force is exerted on only one wheel like the conventional device. As a result, the (whole) braking forces exerted on these two wheels can effectively function as decelerating force for decelerating the vehicle, thereby being capable of effectively reducing the centrifugal force exerted on the vehicle by the deceleration of the vehicle. Therefore, the expected yawing moment can be generated on the vehicle more suitably, thereby being capable of more surely bringing the vehicle turning state into the target state.

Further, the braking force by the brake fluid pressure is exerted on only two wheels of one circuit in the "X-conduit" during when (only) brake steering control is executed, whereby the control valve, of the control valves SA1 and SA2 (see FIG. 2), corresponding to one circuit is controlled to be actuated and the control valve corresponding to the other circuit is kept to be non-actuated. As a result, the communication between the master cylinder MC (or hydraulic booster HB) in the other circuit and each wheel cylinder of these two wheels is secured, so that the degradation in the operation feeling on the brake pedal does not occur compared to the conventional device, and a fail-safe function can be achieved even if abnormality occurs on one circuit. It is preferable that the change-over valve STR (see FIG. 2) is independently provided every circuit in order to more surely achieve this fail-safe function.

The present invention is not limited to the above-mentioned embodiments. Various modifications can be applied within the scope of the present invention. For example, although the slip ratio of each wheel is used as the control target for controlling the braking force exerted on each wheel of the vehicle, any physical volume such as brake fluid pressure in the wheel cylinder W** of each wheel may be used as a controlled target, so long as it is physical volume that changes according to the braking force exerted on each wheel.

Further, the above-mentioned embodiment is configured such that, when the sum of the braking forces (Gb+Gd) corresponding to the sum of the braking force according to the yaw control volume Gd and the braking force according to the basic control volume Gb exceeds the upper limit value Gmax, the basic control volume Gb is limited in such a manner that the sum of the braking forces becomes equal to the upper limit value Gmax. However, it may be configured such that, when the total sum of the braking forces corresponding to the total sum of the braking forces by the brake fluid pressure exerted on two wheels (2·Gb+Gd) exceeds the upper limit value Gmax, the basic control volume Gb is limited in such a manner that the total sum of the braking forces becomes equal to the upper limit value Gmax.

What is claimed is:

1. A vehicle motion control device applied to a vehicle provided with a brake conduit composed of a dual circuit comprising a circuit for supplying brake fluid pressure to each wheel cylinder of a front-right wheel and a rear-left wheel and a circuit for supplying brake fluid pressure to each wheel cylinder of a front-left wheel and a rear-right wheel, each of which is independent of each other, comprising:

turning state obtaining means for obtaining a turning state of the vehicle; and turning state control means for producing a predetermined yawing moment on the vehicle for bringing the turning state of the vehicle into a target state belonging to one of the dual circuit in a case where brake operation by a driver is not executed, wherein the turning state control means comprises:

basic control volume calculating means for calculating basic control volume for decelerating the vehicle based upon the running state of the vehicle; and yaw control volume calculating means for calculating yaw control volume for producing the predetermined yawing moment on the vehicle based upon the turning state of the vehicle, wherein when the turning state of the vehicle is in the understeer state, the turning state control means is configured to exert the braking force according to the basic control volume on the front wheel at the outer side of the turning direction and exert the braking force, that is obtained by adding the braking force according to the yaw control volume to the braking force according to the basic control volume, on the rear wheel at the inner side of the turning direction, and when the turning state of the vehicle is in the oversteer state, the turning state control means is configured to exert the braking force according to the basic control volume on the rear wheel at the inner side of the turning direction and exert the braking force, that is obtained by adding the braking force according to the yaw control volume to the braking force according to the basic control volume, on the front wheel at the outer side of the turning direction.

2. A vehicle motion control device claimed in claim 1, wherein the yaw control volume calculating means is configured to calculate the yaw control volume based upon a deviation between a target yaw rate related amount, set based upon at least a vehicle body speed and a steering operation amount, and an actual yaw rate related amount exerted on the vehicle.

3. A vehicle motion control device claimed in claim 1, wherein the basic control volume based upon at least one of the vehicle body speed and a road friction coefficient.

4. A vehicle motion control device claimed in claim 1, wherein the basic control volume calculating means is configured to calculate the basic control volume such that the changing speed of the basic control volume is limited according to the running state of the vehicle.

5. A vehicle motion control device claimed in claim 1, wherein the basic control volume calculating means is configured to calculate the basic control volume such that the basic control volume is limited according to the yaw control volume calculated by the yaw control volume calculating means.

6. A vehicle motion control device claimed in claim 1, wherein the turning state control means is configured to lower the output of the driving source of the vehicle according to the driving state of the vehicle and exert, on the two wheels, braking force by brake fluid pressure that is smaller than the braking force by the brake fluid pressure according to the basic volume by the braking force corresponding to the decrease in th output of the driving source, instead of exerting the braking force by the brake fluid pressure according to the basic control volume on the two wheels.

7. A vehicle motion control device claimed in claim 1, wherein the turning state control means does not exert the braking force by brake fluid pressure on two wheels belonging to the other one of the circuit of the dual circuit.

8. A vehicle motion control device applied to a vehicle provided with a brake conduit composed of a dual circuit comprising a circuit for supplying brake fluid pressure to each wheel cylinder of a front-right wheel and a rear-left wheel and a circuit for supplying brake fluid pressure to each wheel cylinder of a front-left wheel and a rear-right wheel, each of which is independent of each other, comprising:

turning state obtaining means for obtaining a turning state of the vehicle; and turning state control means for producing a predetermined yawing moment on the vehicle for bringing the turning state of the vehicle into a target state by respectively exerting braking force by brake fluid pressure on two wheels belonging to one of the dual circuit in a case where brake operation by a driver is not executed, wherein the turning state control means comprises:

basic control volume calculating means for calculating basic control volume for decelerating the vehicle based upon the running state of the vehicle; and yaw control volume calculating means for calculating yaw control volume for producing the predetermined yawing moment on the vehicle based upon the turning state of the vehicle, wherein when the turning state of the vehicle is in the understeer state, the turning state control means is configured to exert the braking force according to the basic control volume on the front wheel at the outer side of the turning direction and simultaneously exert the braking force, that is obtained by adding the braking force according to the yaw control volume to the braking force according to the basic control volume, on the rear wheel at the inner side of the turning direction, and when the turning state of the vehicle is in the oversteer state, the turning state control means is configured to exert the braking force according to the basic control volume on the rear wheel at the inner side of the turning direction and simultaneously exert the braking force, that is obtained by adding the braking force according to the yaw control volume to the braking force according to the basic control volume, on the front of wheel at the outer side of the turning direction.

9. A vehicle motion control device claimed in claim 8, wherein the turning state control means does not exert the braking force by brake fluid pressure on two wheels belonging to the other one of the circuits of the dual circuit.

10. A vehicle motion control device claimed in claim 8, wherein the yaw control volume calculating means calculates the yaw control volume based upon a deviation between a target yaw rate related amount, set based upon at least a vehicle body speed and a steering operation amount, and an actual yaw rate related amount exerted on the vehicle.

11. A vehicle motion control device claimed in claim 8, wherein the basic control volume calculating means calculates the basic control volume based upon at least one of the vehicle body speed and a road friction coefficient.

12. A vehicle motion control device claimed in claim 8, wherein the basic control volume calculating means calculates the basic control volume such that the changing speed of the basic control volume is limited according to the running state of the vehicle.

13. A vehicle motion control device claimed in claim 8, wherein the basic control volume calculating means calculates the basic control volume such that the basic control volume is limited according to the yaw control volume calculated by the yaw control volume calculating means.

14. A vehicle motion control device claimed in claim 8, wherein the turning state control means lowers the output of the driving source of the vehicle according to the driving state of the vehicle and exerts, on the two wheels, braking force by brake fluid pressure that is smaller than the braking force by the brake fluid pressure according to the basic control volume by the braking force corresponding to the decrease in the output of the driving source, instead of exerting the braking force by the brake fluid pressure according to the basic control volume on the two wheels.

15. A vehicle motion control device applied to a vehicle provided with a brake conduit composed of a dual circuit comprising a circuit for supplying brake fluid pressure to each wheel cylinder of a front-right wheel and a rear-left wheel and a circuit for supplying brake fluid pressure to each wheel cylinder of a front-left wheel and a rear-right wheel, each of which is independent of each other, comprising:

turning state obtaining means for obtaining a turning state of the vehicle; and turning state control means for producing a predetermined yawing moment on the vehicle for bringing for turning state of the vehicle into a target state by respectively exerting braking force by brake fluid pressure on two wheels belonging to one of the dual circuit in a case where brake operation by a driver is not executed, wherein the turning state control means comprises:

basic control volume calculating means for calculating basic control volume for decelerating the vehicle based upon the running state of the vehicle; and yaw control volume calculating means for calculating yaw control volume for producing the predetermined yawing moment on the vehicle based upon the turning state of the vehicle, wherein when the turning state of the vehicle is in the understeer state, the turning state control means is configured to increase the braking force according to the basic control volume on the front wheel at the outer side of the turning direction and increase the braking force, that is obtained by adding the braking force according to the yaw control volume to the braking force according to the basic control volume, on the rear wheel at the inner side of the turning direction, and when the turning state of the vehicle is in the oversteer state, the turning state control means is configured to increase the braking force according to the basic control volume on the rear wheel at the inner side of the turning direction and increase the braking force, that is obtained by adding the braking force according to the yaw control volume to the braking force according to the basic control volume, on the front wheel at the outer side of the turning direction.

16. A vehicle motion control device claimed in claim 15, wherein the turning state control means does not exert the braking force by brake fluid pressure on two wheels belonging to the other one of the circuits of the dual circuit.

17. A vehicle motion control device claimed in claim 15, wherein the yaw control volume calculating means calculates the yaw control volume based upon a deviation between a target yaw rate related amount, set based upon at least a vehicle body speed and a steering operation amount, and an actual yaw rate related amount exerted on the vehicle.

18. A vehicle motion control device claimed in claim 15, wherein the basic control volume calculating means calculates the basic control volume based upon at least one of the vehicle body speed and a road friction coefficient.

19. A vehicle motion control device claimed in claim 15, wherein the basic control volume calculating means calculates the basic control volume such that the changing speed of the basic control volume is limited according to the running state of the vehicle.

20. A vehicle motion control device claimed in claim 15, wherein the basic control volume calculating means calculates the basic control volume such that the basic control volume is limited according to the yaw control volume calculated by the yaw control volume calculating means.

* * * * *